US012548702B2

(12) United States Patent
Jeong et al.

(10) Patent No.: US 12,548,702 B2
(45) Date of Patent: Feb. 10, 2026

(54) MAGNET ORIENTATION DEVICE AND MAGNET

(71) Applicant: LG Electronics Inc., Seoul (KR)

(72) Inventors: Gyujong Jeong, Seoul (KR); Sangjoon Eum, Seoul (KR); Songe Park, Seoul (KR); Jeonghyun Cho, Seoul (KR); Kyungho Ha, Seoul (KR)

(73) Assignee: LG Electronics Inc., Seoul (KR)

( * ) Notice: Subject to any disclaimer, the term of this patent is extended or adjusted under 35 U.S.C. 154(b) by 170 days.

(21) Appl. No.: 18/591,502

(22) Filed: Feb. 29, 2024

(65) Prior Publication Data

US 2025/0014797 A1 Jan. 9, 2025

(30) Foreign Application Priority Data

Jul. 4, 2023 (KR) ........................ 10-2023-0086329

(51) Int. Cl.
*H01F 13/00* (2006.01)
*H01F 7/02* (2006.01)

(52) U.S. Cl.
CPC ............. *H01F 13/003* (2013.01); *H01F 7/02* (2013.01)

(58) Field of Classification Search
CPC ..................................................... H01F 13/003
USPC ........................ 310/154.28, 156.43; 335/284
See application file for complete search history.

(56) References Cited

U.S. PATENT DOCUMENTS 4,056,770 A * 11/1977 Mohr .................... H01F 7/0205 324/205
5,660,786 A * 8/1997 Ledran ................ H01F 41/0273 264/428

FOREIGN PATENT DOCUMENTS

WO WO-2012033202 A1 * 3/2012 ............. H02K 15/03

OTHER PUBLICATIONS

Extended European Search Report in European Appln. No. 24162852.8, mailed on Aug. 14, 2024, 7 pages.

* cited by examiner

*Primary Examiner* — Alexander Talpalatski
(74) *Attorney, Agent, or Firm* — Fish & Richardson P.C.

(57) ABSTRACT

A magnet orientation device includes an upper plate disposed on a magnet raw material, a lower plate disposed below the magnet raw material, and dies disposed on sides of the magnet raw material. The upper plate has a convex upward arc shape. The upper plate includes a first magnetic region and a first non-magnetic region that surround the first magnetic region and the lower plate includes a second magnetic region and a second non-magnetic region that surround the second magnetic region. A lower surface of the first magnetic region provides a plurality of grooves and an upper surface of the second magnetic region provides a plurality of protrusions. A horizontal length of the first magnetic region is greater than a horizontal length of the magnet raw material and a horizontal length of the second magnetic region is equal to or less than the horizontal length of the magnet raw material.

20 Claims, 19 Drawing Sheets

MAGNET ORIENTATION DEVICE AND MAGNET

CROSS-REFERENCE TO RELATED APPLICATION

This application claims priority to and the benefit of Korean Patent Application No. 10-2023-0086329, filed on Jul. 4, 2023, the disclosure of which is incorporated herein by reference in its entirety.

TECHNICAL FIELD

The present disclosure relates to a magnet orientation device and a magnet, more specifically, to a magnet orientation device and a magnet for improving back electromotive force.

BACKGROUND

In general, washing machines can include an outer tub that can contain wash water and an inner tub rotatably disposed in the outer tub to accommodate laundry such as clothes. Washing and spin-drying of the laundry can be performed as the inner tub rotates.

The washing machines can be classified as a top loading type or a front loading type. In a top loading type, a rotation center of the inner tub can be disposed in a direction perpendicular to a floor and the laundry cloth can be inserted from the top. In a front loading type, the rotation center of the inner tub can be disposed in a direction horizontal to the floor or can be inclined downward toward a back end, and the laundry cloth can be inserted from the front.

The top loading type washing machine can be classified into an agitator type and a pulsator type. The agitator type can perform the laundry by rotating a laundry rod towering in the center of the inner tub, and the pulsator type can perform the laundry by rotating a disk-shaped pulsator disposed in the lower part of the inner tub.

The front loading type is commonly referred to as a "drum washing machine," and a lifter can be disposed at an inner circumferential surface of the inner tub, and as the drum rotates, the lifter can lift and drop the laundry to perform washing.

The washing machine can operate in two main operating modes (e.g., washing mode and spin-drying mode) with different operating conditions.

To operate the washing machine with the two main operating modes, the washing machine can be provided with a clutch and can operate an output shaft at low speed and high torque with a gear ratio of n:1 (e.g., washing mode) or operate the output shaft at high speed and low torque with a gear ratio of 1:1 (e.g., spin-drying mode).

In an example, addition of a planetary gear to the washing machine can reduce power consumption and enhance operating efficiency of the motor.

In general, washing machines can be equipped with an outer rotor motor. In the outer rotor motor, a stator wound with coil can be installed inside, and a rotor can be arranged radially outside the stator as if a magnet surrounds the coil of the stator. The rotor can include a plurality of magnets that can be radially arranged.

Before magnetic material is magnetized, electrons in the magnetic material can be randomly arranged. To magnetize the magnetic material and transform it into a magnet, an electron array can be oriented within the magnetic material in a certain direction. This can be followed by a magnetization process to magnetically polarize the magnetic material by applying an external magnetic field.

The magnet can have a plurality of polar regions which can have a plurality of magnetic center lines. Issues such as reduced motor output and an increase in noise can arise when the plurality of magnetic center lines are formed in an asymmetric shape due to a magnetic division region that connects the plurality of polar regions and physical division regions located at both ends of the magnet.

SUMMARY

A magnet orientation device can include an upper plate disposed on a magnet raw material, a lower plate disposed under the magnet raw material, and a plurality of dies disposed at sides of the magnet raw material. The upper plate can have a convex upward arc shape. The upper plate can include a first magnetic region and a first non-magnetic region that surround the first magnetic region, and the lower plate can include a second magnetic region and a second non-magnetic region that surround the second magnetic region. A lower surface of the first magnetic region can provide a plurality of concave upward grooves and an upper surface of the second magnetic region can provide a plurality of convex upward protrusions. A horizontal length of the first magnetic region can be greater than a horizontal length of the magnet raw material and a horizontal length of the second magnetic region can be equal to or less than the horizontal length of the magnet raw material.

In some implementations, a difference between the horizontal length of the magnet raw material and the horizontal length of the second magnetic material region can be greater than or equal to 0 and less than or equal to 2 millimeter (mm). For example, the horizontal length of the magnet raw material can be equal to the horizontal length of the second magnetic material region.

In some implementations, a difference between the horizontal length of the first magnetic region and the horizontal length of the magnet raw material can be greater than or equal to 0.2 and less than or equal to 0.5 mm.

In some implementations, the first non-magnetic region can protrude downward from a center of the first non-magnetic region to a first side end and a second side end of the first non-magnetic region, and the second non-magnetic region can protrude upward from a first side end and a second side end of the second non-magnetic region to the center of the second non-magnetic region.

In some implementations, each of the plurality of concave upward grooves and the plurality of convex upward protrusions can be a curvature.

A magnet orientation device can include an upper plate disposed on a magnet raw material, a lower plate disposed under the magnet raw material, and a plurality of dies disposed at sides of the magnet raw material. The upper plate can have a convex upward arc shape. The upper plate can include a first magnetic region and a first non-magnetic region that surround the first magnetic region, and the lower plate can include a second magnetic region and a second non-magnetic region that surround the second magnetic region.

In some implementations, a lower surface of the first magnetic region can provide a plurality of concave upward grooves, an upper surface of the second magnetic region can provide a plurality of convex upward protrusions. Each of the plurality of concave upward grooves and the plurality of convex upward protrusions can be a curvature. Among the plurality of concave upward grooves, a shape of concave upward grooves adjacent to each of the sides of the first magnetic region can be different from a shape of the other concave upward grooves, and among the plurality of convex upward protrusions, a shape of the convex upward protrusions adjacent to each of the sides of the second magnetic material region can be different from a shape of the other convex upward protrusions.

In some implementations, among the plurality of concave upward grooves, the concave upward grooves adjacent to each of the sides of the first magnetic region each can include a plurality of curvatures, and the other grooves each can include a single curvature.

In some implementations, among the plurality of concave upward grooves, the concave upward grooves adjacent to the side ends of the first magnetic region each can include a first curvature and the other concave upward grooves each can include a second curvature that can be different from the first curvature. In some implementations, a radius of the first curvature can be greater than a radius of the second curvature. In some implementations, a value obtained by dividing the first curvature by the second curvature can be between 1 and 1.2.

In some implementations, among the plurality of convex upward protrusions, each of the convex upward protrusions adjacent to each of the sides of the second magnetic region can include a plurality of curvatures, and each of the other convex upward protrusions can include a single curvature. In some implementations, among the plurality of convex upward protrusions, the convex upward protrusions adjacent to the side ends of the second magnetic region each includes a third curvature, and the other convex upward protrusions each includes a fourth curvature that is different from the third curvature. In some implementations, a radius of the third curvature can be greater than a radius of the fourth curvature. In some implementations, a value obtained by dividing the third curvature by the fourth curvature can be between 1 and 1.25.

In some implementations, the first non-magnetic region can protrude downward from the center of the first non-magnetic region to both sides of the first non-magnetic region, and the second non-magnetic region can protrude upward from both sides of the second non-magnetic region to a center of the second non-magnetic region.

In some implementations, a horizontal length of the first magnetic region can be greater than a horizontal length of the magnet raw material.

In some implementations, a horizontal length of the second magnetic region can be equal to or less than a horizontal length of the magnet raw material.

A magnet can include a magnet orientation device. The magnet orientation device can include an upper plate disposed on a magnet raw material, a lower plate disposed under the magnet raw material, and a plurality of dies disposed at sides of the magnet raw material. The upper plate can have a convex upward arc shape. The upper plate can include a first magnetic region and a first non-magnetic region that surround the first magnetic region, and the lower plate can include a second magnetic region and a second non-magnetic region that surround the second magnetic region. A lower surface of the first magnetic region can provide a plurality of concave upward grooves and an upper surface of the second magnetic region can provide a plurality of convex upward protrusions. A horizontal length of the first magnetic region can be greater than a horizontal length of the magnet raw material and a horizontal length of the second magnetic region can be equal to or less than the horizontal length of the magnet raw material.

In some implementations, a difference between the horizontal length of the magnet raw material and the horizontal length of the second magnetic material region can be greater than or equal to 0 and less than or equal to 2 mm.

DETAILED DESCRIPTION

Figure 1:
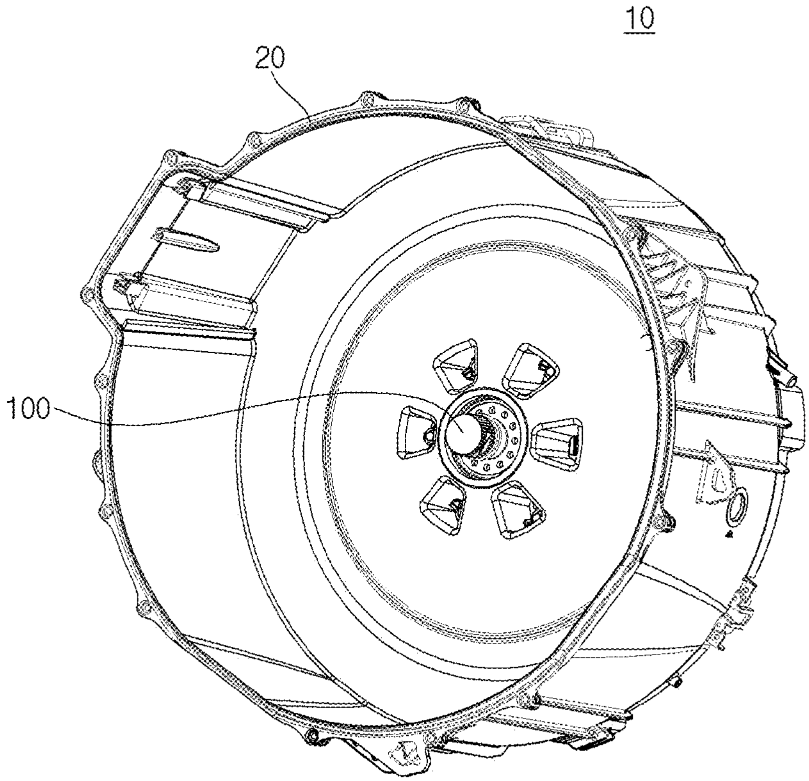
FIGS. 1 and 2 are diagrams illustrating examples of a washing machine.
Figure 2:
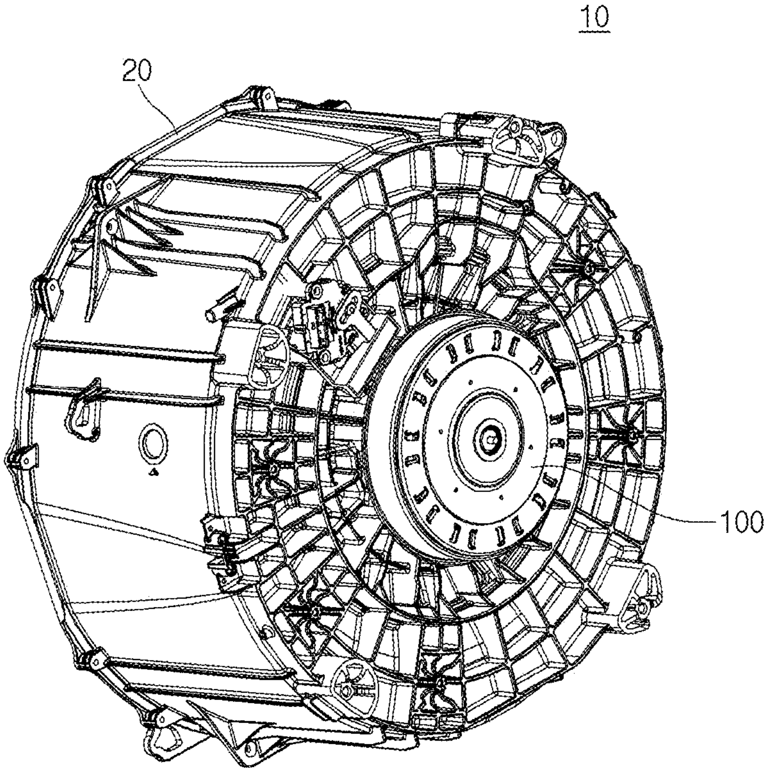

FIGS. 1 and 2 are diagram illustrating examples of perspective views of a washing machine.

Referring to FIGS. 1 and 2, a washing machine 10 can include an outer tub 20 and a washing machine driving system 100.

The washing machine 10 will be described using a front loading type design so that a rotation center of an inner tub can be formed in a direction horizontal relative to the floor or can be inclined downward toward a back end and the laundry (e.g., laundry items) can be inserted from the front as an example, but the detailed configuration of the washing machine driving system 100 can also be applied to a top loading type washing machine.

The outer tub 20 can have a cylindrical shape with an open top or an open front portion. An inner tub can be disposed inside the outer tub 20. The outer tub 20 can be made of plastic material. The inner tub can be connected to an output shaft 110 of the washing machine driving system 100. The washing machine driving system 100 can be coupled to the inner tub of the washing machine 10 and can rotate the inner tub.

Figure 3:
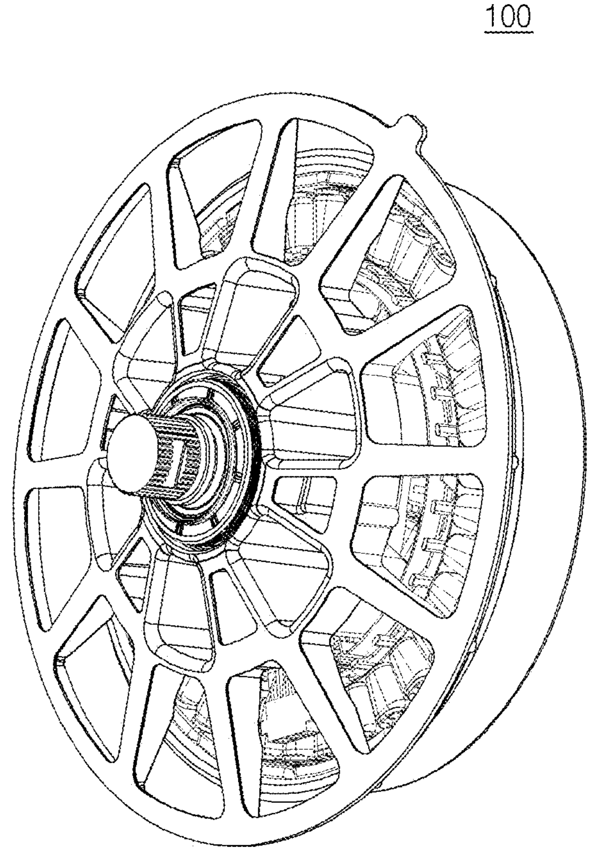
FIG. 3 is a diagram illustrating an example of a washing machine driving system.
Figure 4:
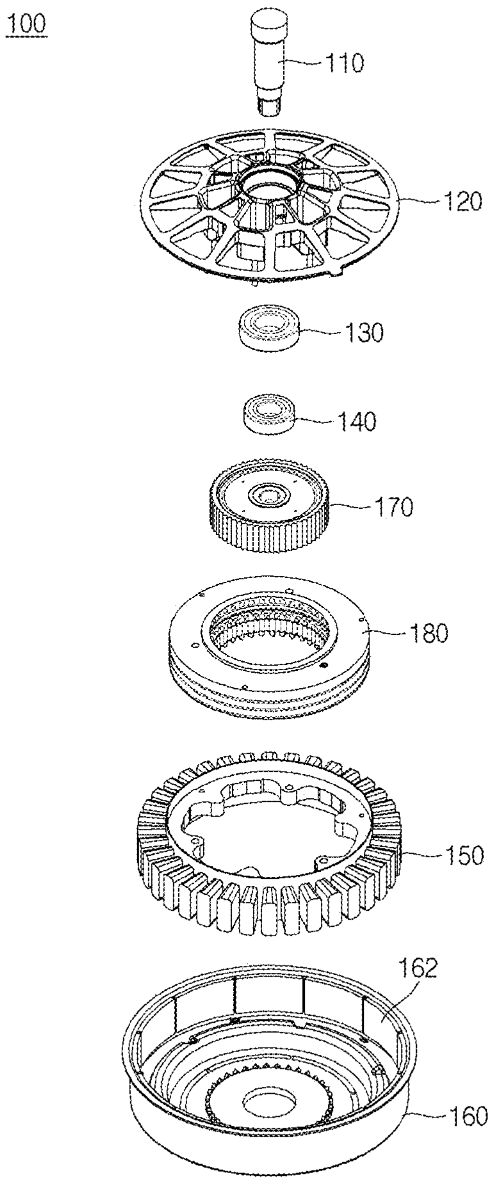
FIG. 4 is a diagram illustrating an exploded perspective view of an example of a washing machine driving system.
Figure 5:
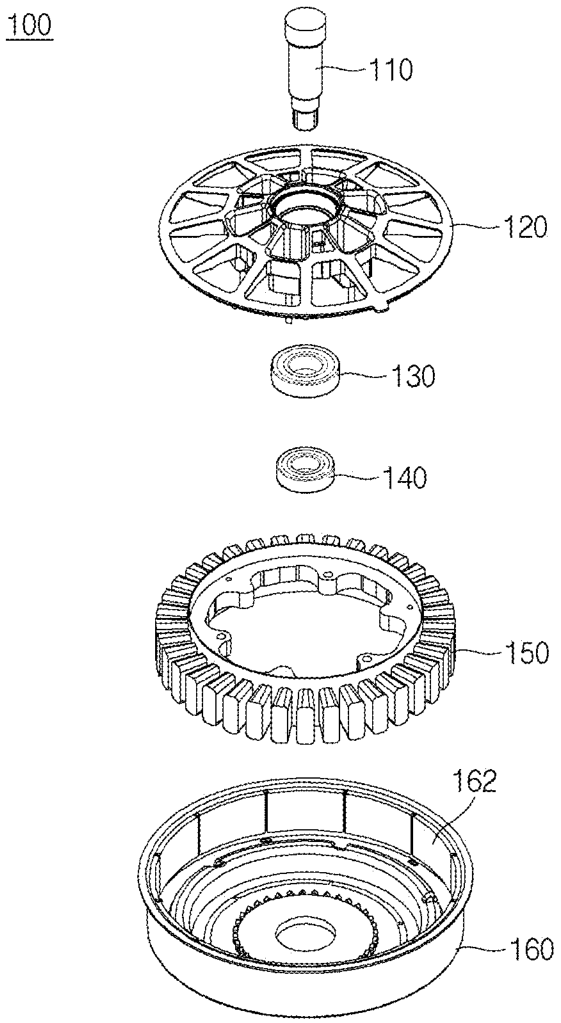
FIG. 5 is a diagram illustrating an exploded perspective view of an example of a washing machine driving system.
Figure 6:
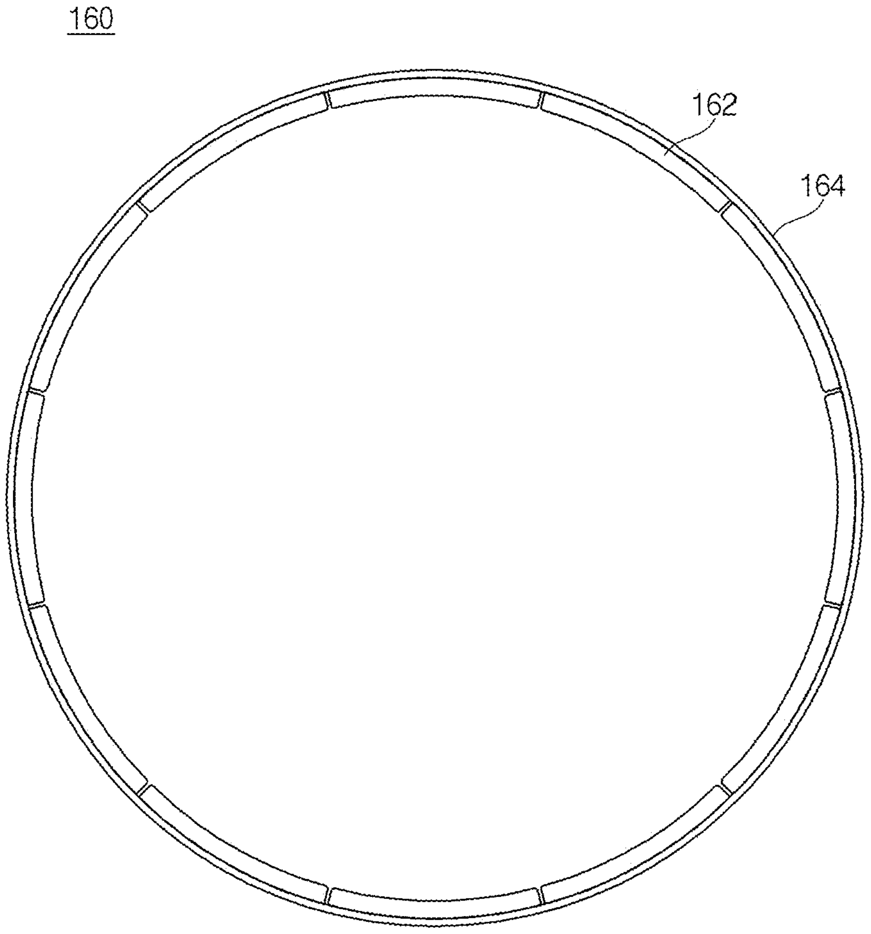
FIG. 6 is a diagram illustrating a plain view of an example of a rotor.

FIG. 3 is a diagram illustrating an example of a washing machine driving system. FIG. 4 is a diagram illustrating an exploded perspective view of an example of a washing machine driving system. FIG. 5 is a diagram illustrating an exploded perspective view of an example of a washing machine driving system. FIG. 6 is a diagram illustrating a plain view of an example of a rotor.

Referring to FIGS. 3, 4, and 6, a washing machine driving system 100 can include an output shaft 110, a housing 120, a first bearing 130, a second bearing 140, a stator 150, a rotor 160, a planetary gear set 170, and a clutch 180, but the washing machine driving system 100 can be implemented excluding some of these configurations, and additional configurations other than these are not excluded.

As shown in FIG. 5, the washing machine driving system 100 can be implemented excluding the planetary gear set 170 and the clutch 180.

The output shaft 110 can extend in an axial direction. The output shaft 110 can be coupled to the inner tub. The output shaft 110 can be rotatably coupled to the housing 120. The output shaft 110 can be coupled to the housing 120. The output shaft 110 can be coupled to the planetary gear set 170.

The inner tub can be coupled to an upper region of the output shaft 110. A central region of the output shaft 110 can be coupled to the housing 120 using one or more bearings. The first bearing 130 and the second bearing 140 can be disposed between the central region of the output shaft 110 and the housing 120.

A lower region of the output shaft 110 can be disposed within the rotor 160. The lower region of the output shaft 110 can be coupled to the planetary gear set 170. A diameter of the lower region of the output shaft 110 can be less than a diameter of the central region. An axial length of the lower region of the output shaft 110 can be less than an axial length of the central region of the output shaft 110.

The output shaft 110 can be rotatably coupled to the housing 120. The inner tub and the outer tub 20 can be disposed on an upper portion of the housing 120. The housing 120 can be coupled to the outer tub 20. The stator 150, the rotor 160, the planetary gear set 170, and the clutch 180 can be disposed in the lower portion of the housing 120. The housing 120 can be coupled to the stator 150. The housing 120 can be made of plastic material.

The first bearing 130 can be disposed between the output shaft 110 and the housing 120. The first bearing 130 can be used to couple the output shaft 110 to the housing 120. The first bearing 130 can be used to rotatably couple the output shaft 110 to the housing 120. The first bearing 130 can extend in a circumferential direction. The first bearing 130 can be disposed on the second bearing 140.

The second bearing 140 can be disposed between the output shaft 110 and the housing 120. The second bearing 140 can be used to couple the output shaft 110 to the housing 120. The second bearing 140 can be used to rotatably couple the output shaft 110 to the housing 120. The second bearing 140 can extend in the circumferential direction. The second bearing 140 can be disposed below the first bearing 130. The second bearing 140 can be disposed on the planetary gear set 170. The second bearing 140 can be disposed radially inside the stator 150.

The stator 150 can be coupled to the housing 120. The stator 150 can be disposed inside the rotor 160. The stator 150 can face the rotor 160. The stator 150 can be disposed on the clutch 180. The stator 150 can include a coupling portion coupled to the housing 120, a stator unit (e.g., stator tooth) disposed radially outside the coupling portion, and a coil wound around the stator unit. The stator 150 can rotate the rotor 160 through electromagnetic interaction.

The rotor 160 can face the stator 150. The rotor 160 can be coupled to the planetary gear set 170. Based on the rotor 160 being coupled to the planetary gear set 170, the rotor 160 can supply rotational force to the output shaft 110.

The rotor 160 can include a rotor core 164 disposed on an outer radial side of the stator 150, and a magnet 162 disposed on an inner surface of the rotor core 164. The magnet 162 can face the stator 150. The magnet 162 can face one or more stator units (e.g., stator tooth) of the stator 150. When electrical current is supplied to the coil of the stator 150, the magnet 162 can rotate in one direction or the other direction due to electromagnetic interaction.

The magnet 162 may include a plurality of magnets 162 spaced apart in the circumferential direction. The plurality of magnets 162 can be spaced apart along the inner surface of the rotor core 164. The plurality of magnets 162 can be disposed radially with respect to a central region of the rotor core 164. Each of the plurality of magnets 162 can face a plurality of stator units spaced apart in the circumferential direction.

The stator 150 and the rotor 160 can be referred to as a "motor."

The planetary gear set 170 can be spline-coupled to an outer circumferential surface of the output shaft 110. The planetary gear set 170 can be coupled to the rotor 160. The planetary gear set 170 can rotate integrally with the rotor 160. The planetary gear set 170 can transmit the rotational force of the rotor 160 to the output shaft 110.

For example, the planetary gear set 170 can transmit the rotational force of the rotor 160 to the output shaft 110 at a gear ratio of 1:1 or at a reduced the speed (e.g., at a gear ratio of n:1). In another example, a gear ratio can be reduced to 1:1 and the planetary gear set 170 can transmit the rotational force of the rotor 160 to the output shaft at such gear ratio of 1:1. Based on this variability, the washing mode and spin-drying mode can be implemented without stopping between the end of washing and the start of spin-drying.

The clutch 180 can be disposed between the motors 150 and 160 and the planetary gear set 170. A first portion of the clutch 180 can be spline-coupled to the planetary gear set 170, and a second portion of the clutch 180 can be coupled to the stator 150. The clutch 180 can engage (e.g., fix) or disengage one or more components of the planetary gear set 170. Based on this feature (e.g., engagement or disengagement), the clutch 180 can allow the planetary gear set 170 to transmit the rotational force of the rotor 160 to the output shaft 110 at the gear ratio of 1:1. For example, the gear ratio can be reduced to 1:1 and the planetary gear set 170 can transmit the rotational force of the rotor 160 to the output shaft 110 at the gear ratio of 1:1.

FIGS. 7 to 10 are diagrams illustrating plain views of an example of a magnet. FIG. 11 is a diagram illustrating a plain view of an example of a rotor. FIG. 12 is a diagram illustrating an enlarged view of portion A of FIG. 11.

In some implementations, the magnet 162 can be used in the washing machine 10 without the planetary gear set 170 and the clutch 180, as shown in FIG. 5.

Figure 7:
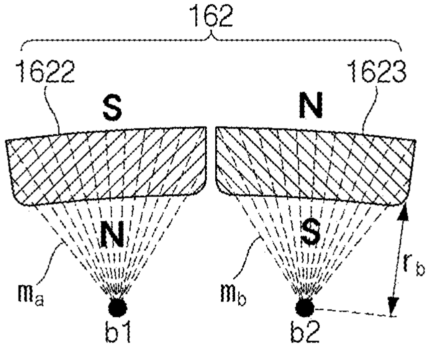
FIGS. 7 to 10 are diagrams illustrating plain views of an example of a magnet.

Referring to FIG. 7, the magnet 162 can include single polar regions 1622 and 1623. The single polar regions 1622 and 1623 can be spaced apart in the circumferential direction. The single polar regions 1622 and 1623 can be arranged side by side in the circumferential direction. The single polar regions 1622 and 1623 that are disposed adjacent to each other can have different polarities. For example, an inner surface of a first polar region 1622 can have a North (N) pole. For example, an inner surface of a second polar region 1623, which is spaced apart from the first polar region 1622 in the circumferential direction, can have a South(S) pole.

The single polar regions 1622 and 1623 can together form an arc shape. The adjacent single polar regions 1622 and 1623 each can have magnetic focus centers b1 and b2, respectively, that are different from a center O of an inner diameter r-i of the single polar regions 1622 and 1623. For example, a first magnetic focus center b1 can be a focus center of a first magnetic orientation ($m_a$) of the first polar region 1622 and a second magnetic focus center b2 can be a focus center of a second magnetic orientation (mb) of the second polar region 1623. A distance ($r_b$) between the magnetic focus center b1 and the single polar region 1622 can be equal to a distance between the magnetic focus center b2 and the single polar region 1623.

In some implementations, the magnet 162 being formed based on the single polar regions 1622 and 1623 can be defined as a "one-pole magnet."

Figure 8:
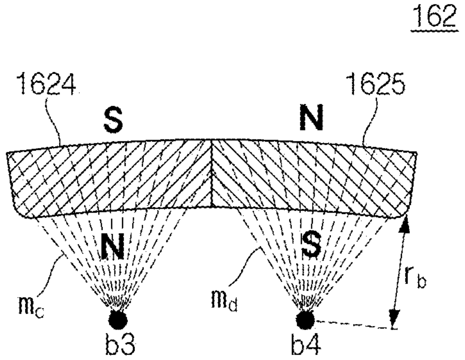

Referring to FIG. 8, the magnet 162 can include two polar regions 1624 and 1625. The two polar regions 1624 and 1625 can be arranged side by side in the circumferential direction. The two polar regions 1624 and 1625 can have different polarities. For example, an inner surface of the third polar region 1624 can have a N pole, and an inner surface of the fourth polar region 1625 can have a S pole.

The two polar regions 1624 and 1625 can together form an arc shape. The adjacent two polar regions 1624 and 1625 can each have magnetic focus centers b3 and b4, respectively, that are different from a center O of an inner diameter r-i of the two polar regions 1624 and 1625. For example, a third magnetic focus center b3 can be a focus center of a third magnetic orientation ($m_c$) of the third polar region 1624, and a fourth magnetic focus center b4 can be a focus center of a fourth magnetic orientation ($m_a$) of the fourth polar region 1625. A distance ($r_b$) between the magnetic focus center b3 and the third polar region 1624 can be equal to a distance between the magnetic focus center b4 and the fourth polar region 1625.

In some implementations, the magnet 162 being formed based on the two polar regions 1624 and 1625 can be defined as a "two-pole magnet."

Figure 9:
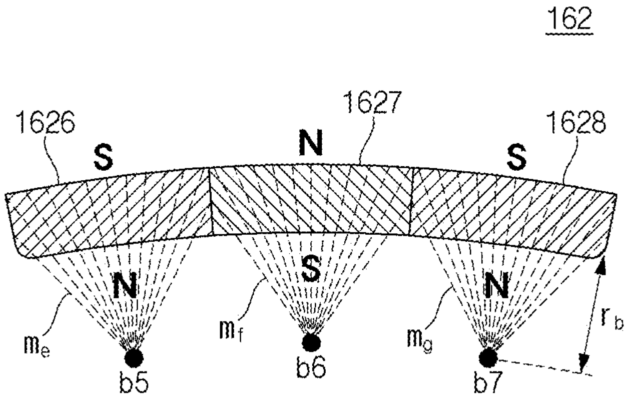

Referring to FIG. 9, the magnet 162 can include three polar regions 1626, 1627, and 1628. The three polar regions 1626, 1627, and 1628 can be arranged side by side in the circumferential direction. The three polar regions 1626, 1627, and 1628 can have different polarities. For example, an inner surface of the fifth polar region 1626 can have a N pole, and an inner surface of the sixth polar region 1627 can have a S pole, and an inner surface of the seventh polar region 1628 can have a N pole.

The three polar regions 1626, 1627, and 1628 can be formed into an arc shape. The adjacent three polar regions 1626, 1627, and 1628 can each have magnetic focus centers b5, b6, and b7, respectively, that are different from a center O of an inner diameter r-i of the three polar regions 1626, 1627, and 1628. For example, a fifth magnetic focus center b5 can be a focus center of a fifth magnetic orientation ($m_e$) of the fifth polar region 1626, a sixth magnetic focus center b6 can be a focus center of a sixth magnetic orientation ($m_f$) of the sixth polar region 1627, and a seventh magnetic focus center b7 can be a focus center of a seventh magnetic orientation ($m_g$) of the seventh polar region 1628. Distances $r_b$ between the magnetic focus centers b5, b6, and b7 of the three polar regions 1626, 1627, and 1628 and the three polar regions 1626, 1627, and 1628 can be equal to each other. The circumferential distances between the magnetic focus centers b5, b6, and b7 of the three polar regions 1626, 1627, and 1628 and adjacent magnetic focus centers can be equal to each other.

In some implementations, the magnet 162 being formed based on the three polar regions 1626, 1627, and 1628 can be defined as a "three-pole magnet."

Figure 10:
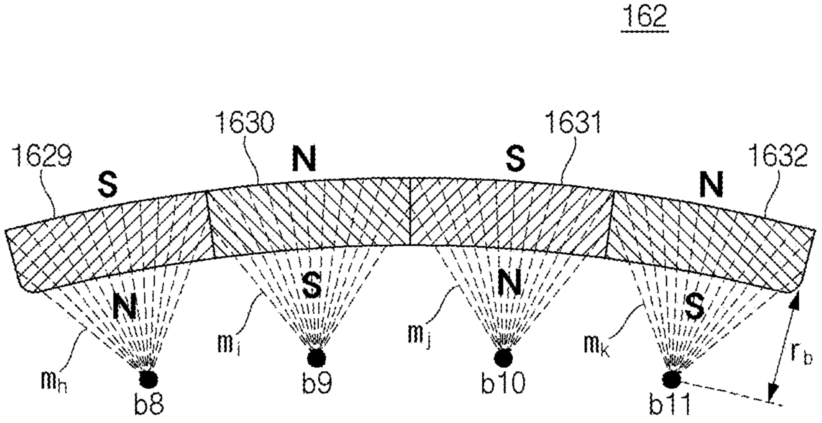
Figure 11:
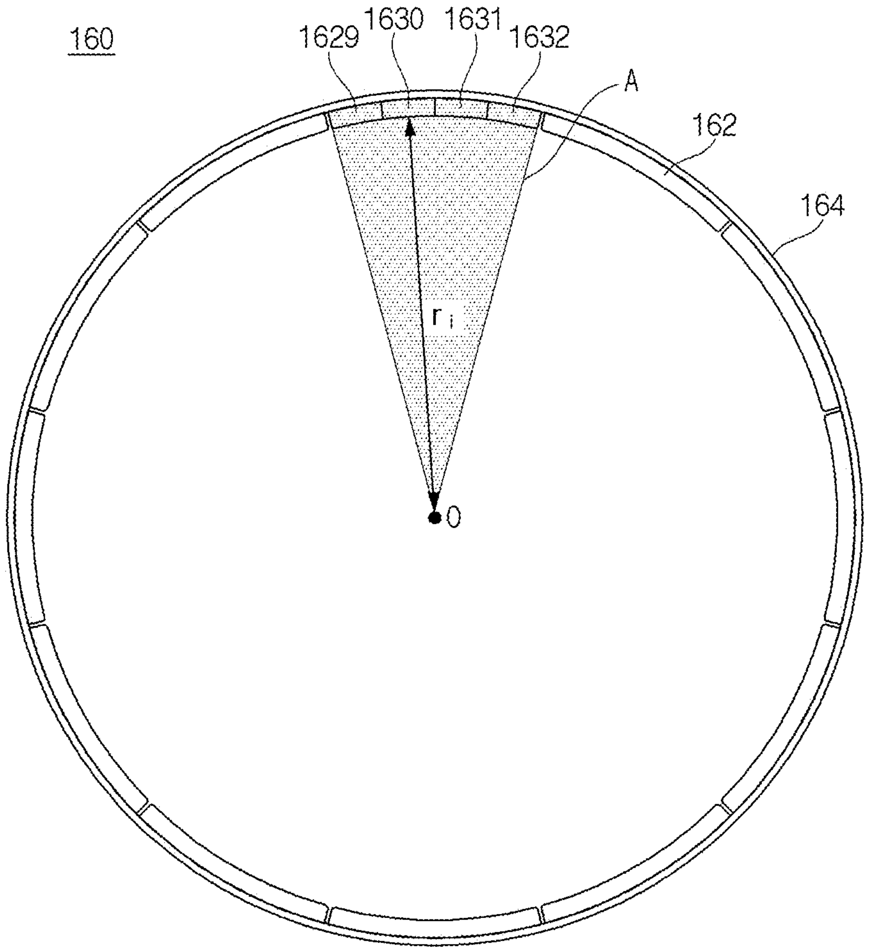
FIG. 11 is a diagram illustrating a plain view of an example of a rotor.
Figure 12:
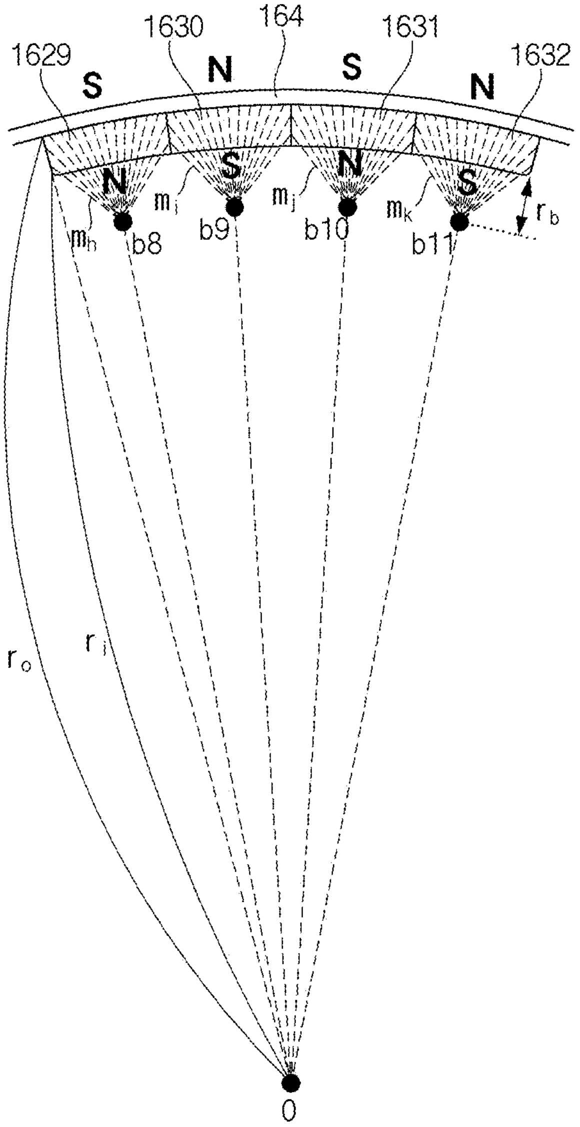
FIG. 12 is a diagram illustrating an enlarged view of portion A of FIG. 11.

Referring to FIGS. 10 to 12, the magnet 162 can include four polar regions 1629, 1630, 1631, and 1632. The four polar regions 1629, 1630, 1631, and 1632 can be arranged side by side in the circumferential direction. The four polar regions 1629, 1630, 1631, and 1632 can have different polarities. For example, an inner surface of the eighth polar region 1629 can have a N pole, and an inner surface of the ninth polar region 1630 can have a S pole, an inner surface of the tenth polar region 1631 can have a N pole, an inner surface of the eleventh polar region 1632 can have a S pole. The four polar regions 1629, 1630, 1631, and 1632 can together form an arc shape.

The adjacent four polar regions 1629, 1630, 1631, and 1632 each can have magnetic focus centers b8, b9, b10, and b11, respectively, that are different from a center O of an inner diameter r-i of the four polar regions 1629, 1630, 1631, and 1632. For example, an eighth magnetic focus center b8 can be a focus center of an eighth magnetic orientation ($m_h$) of the eighth polar region 1629, a ninth magnetic focus center b9 can be a focus center of a ninth magnetic orientation ($m_i$) of the ninth polar region 1630, a tenth magnetic focus center b10 can be a focus center of a tenth magnetic orientation ($m_j$) of the tenth polar region 1631, and an eleventh magnetic focus center b11 can be a focus center of an eleventh magnetic orientation ($m_k$) of the eleventh polar region 1632.

In this case, the distances $r_b$ between the magnetic focus centers b8, b9, b10, and b11 of the four polar regions 1629, 1630, 1631, and 1632 and the four polar regions 1629, 1630, 1631, and 1632 can be equal to each other. The circumferential distances between the magnetic focus centers b8, b9, b10, and b11 of the four polar regions 1629, 1630, 1631, and 1632 and adjacent magnetic focusing centers can be equal to each other.

In some implementations, the magnet 162 being formed based on the four polar regions 1629, 1630, 1631, and 1632 can be defined as a "four-pole magnet."

In some implementations, when one-pole magnet is formed, a number of the plurality of magnets 162 spaced apart in the circumferential direction (e.g., along the stator core) can be 48. When two-pole magnet is formed, a number of the plurality of magnets 162 spaced apart in the circumferential direction (e.g., along the inner surface of the rotor core 164) can be 24. When three-pole magnet is formed, a number of the plurality of magnets 162 spaced apart in the circumferential direction can be 16. When four-pole magnet is formed, a number of the plurality of magnets 162 spaced apart in the circumferential direction can be 12.

Based on different types of magnets (e.g., magnets with different number of polar regions) and arrangement of such magnets, space efficiency of the motors 150 and 160 of the washing machine 10 can be improved.

Even though the examples are described with respect to 1-4 polar regions of a respective magnet (e.g., one-pole magnet, two-pole magnet, three-pole magnet, four-pole magnet), different arrangement can be made based on the magnet having more than 4 polar regions (e.g., five-pole magnet, six-pole magnet, etc.).

Figure 13:
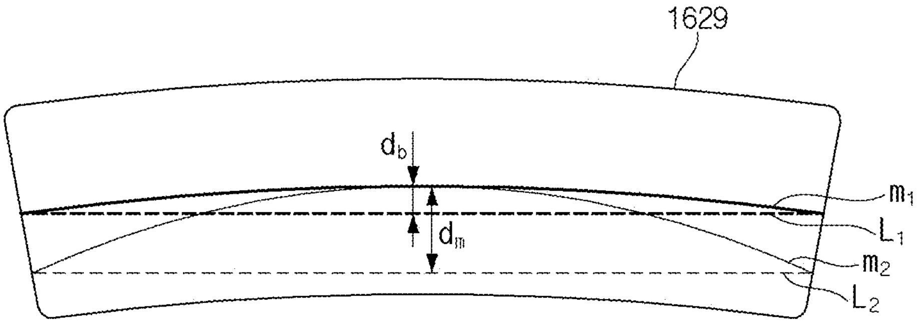
FIG. 13 is a diagram illustrating a plain view of an example of a polar region.

FIG. 13 is a diagram illustrating a plain view of an example of a polar region.

The polar anisotropy coefficient (X) will be described with reference to FIG. 13.

The $d_m$ can correspond to a distance from a straight line ($L_2$) connecting both ends of a magnetic center line ($m_2$) of the at least one polar region (1622, 1623, 1624, 1625, 1626, 1627, 1628, 1629, 1630, 1631, 1632) to a central region of the magnetic center line ($m_2$) of the at least one polar region (1622, 1623, 1624, 1625, 1626, 1627, 1628, 1629, 1630, 1631, 1632).

The $d_b$ can correspond to a distance from a straight line ($L_1$) connecting both ends of a magnetic center line ($m_1$) of the at least one polar region (1622, 1623, 1624, 1625, 1626, 1627, 1628, 1629, 1630, 1631, 1632) to a central region of the magnetic center line ($m_1$) of the at least one polar region (1622, 1623, 1624, 1625, 1626, 1627, 1628, 1629, 1630, 1631, 1632) when the at least one polar region (1622, 1623, 1624, 1625, 1626, 1627, 1628, 1629, 1630, 1631, 1632) has a magnetic focus center that is equal to the center (O) of the inner diameter (r-i) of the at least one polar region (1622, 1623, 1624, 1625, 1626, 1627, 1628, 1629, 1630, 1631, 1632).

In FIG. 13, $d_m$ and $d_b$ are illustrated based on vertical lines (with arrows) spaced left and right. In some implementations, since $d_m$ and $d_b$ are measured from to the central regions of the magnetic center lines ($m_2$, $m_1$) respectively, vertical lines (with arrows) shown to be spaced left and right in FIG. 13 can overlap with each other in reality, and $d_m$ and $d_b$ can correspond to lengths based on such vertical lines.

For example, $d_b$ can be expressed in a form of below Equation (1).

$$d_b = \frac{r_i + r_o}{2} - \sqrt{\left(\frac{r_i + r_o}{2}\right)^2 - \left(\frac{r_o - r_i}{2p}\right)^2} \qquad \text{Equation (1)}$$

The $r_i$ can correspond to an inner radius of the at least one polar region (1622, 1623, 1624, 1625, 1626, 1627, 1628, 1629, 1630, 1631, 1632), $r_o$ can correspond to an outer radius of the at least one polar region (1622, 1623, 1624, 1625, 1626, 1627, 1628, 1629, 1630, 1631, 1632), and p can correspond to the number of the at least one polar region (1622, 1623, 1624, 1625, 1626, 1627, 1628, 1629, 1630, 1631, 1632).

The polar anisotropy coefficient (X) is a coefficient that determines how close the magnetic focus center of the at least one polar region (1622, 1623, 1624, 1625, 1626, 1627, 1628, 1629, 1630, 1631, 1632) is located to the at least one polar region (1622, 1623, 1624, 1625, 1626, 1627, 1628, 1629, 1630, 1631, 1632). For example, the polar anisotropy coefficient (X) can be expressed in a form of below Equation 2.

$$X = \frac{d_m}{d_b} \qquad \text{Equation (2)}$$

Figure 14:
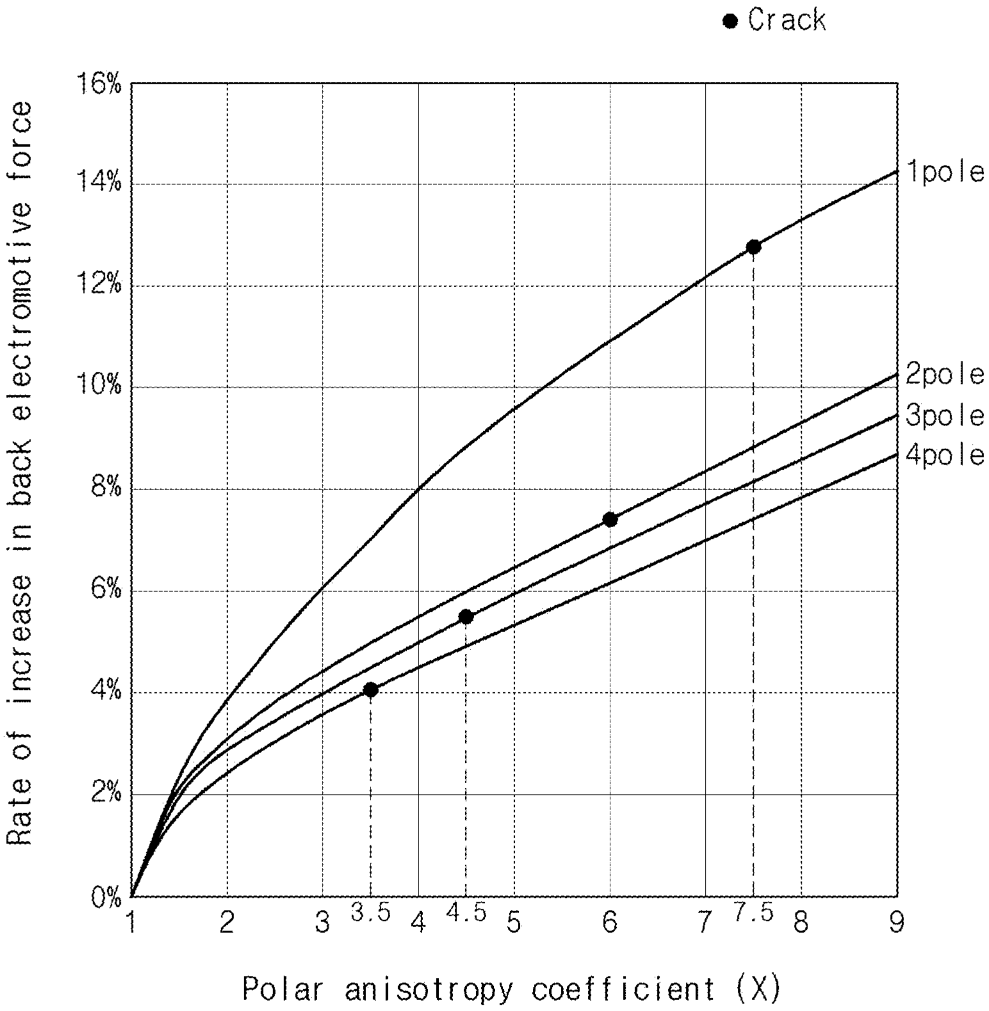
FIG. 14 is a graph illustrating a rate of increase in back electromotive force of an example of a motor with respect to a polar anisotropy coefficient of an example of a magnet.

FIG. 14 is a graph illustrating a rate of increase in back electromotive force of an example of a motor with respect to a polar anisotropy coefficient of an example of a magnet.

Referring to FIG. 14, the rate of increase in back electromotive force is illustrated with respect to the polar anisotropy coefficient (X) of the magnet 162. As the polar anisotropy coefficient (X) of the magnet 162 increases, the rate of increase in back electromotive force of the motors 150 and 160 increases. Here, the rate of increase in back electromotive force refers to a ratio of the back electromotive force when the polar anisotropy coefficient changes compared to the back electromotive force when the polar anisotropy coefficient (X) is 1. The closer the magnetic focus center (b1, b2, b3, b4, b5, b6, b7, b8, b9, b10, b11) of the at least one polar region (1622, 1623, 1624, 1625, 1626, 1627, 1628, 1629, 1630, 1631, 1632) approaches the at least one polar region (1622, 1623, 1624, 1625, 1626, 1627, 1628, 1629, 1630, 1631, 1632), the higher the polar anisotropy coefficient (X) can be.

As the polar anisotropy coefficient (X) increases, the orientation lines (indicating electron arrangement of magnetic material) converge toward the circumferential center of the polar region, since as the rigidity of both ends in the circumferential direction of the polar region weakens, cracks can occur in the magnet 162. That is, when the polar anisotropy coefficient (X) continues to increase, cracks can occur in the magnet 162.

Specifically, if the magnet 162 is a 1-pole magnet, cracks can occur in the magnet 162 when the polar anisotropy coefficient (X) reaches 7.5. If the magnet 162 is a 2-pole magnet, cracks can occur in the magnet 162 when the polar anisotropy coefficient (X) reaches 6. If the magnet 162 is a 3-pole magnet, cracks can occur in the magnet 162 when the polar anisotropy coefficient (X) reaches 4.5. If the magnet 162 is a 4-pole magnet, cracks can occur in the magnet 162 when the polar anisotropy coefficient (X) reaches 3.5.

Therefore, when the number of the at least one polar region 1622 or 1623 of the magnet 162 is 1, it can be preferable that the polar anisotropy coefficient (X) be less than 7.5. When the number of the at least one of the polar regions 1624 and 1625 is 2, it can preferable that the polar anisotropy coefficient (X) be less than 6. When the number of the at least one polar regions 1626, 1627, and 1628 is 3, it can be preferable that the polar anisotropy coefficient (X) be less than 4.5. When the number of the at least four polar regions 1629, 1630, 1631, and 1632 is 4, it can be preferable that the polar anisotropy coefficient (X) be less than 3.5.

Therefore, damage to the product can be diminished by reducing the possibility of cracks occurring in the magnet 162 while increasing the back electromotive force of the motors 150 and 160.

Figure 15:
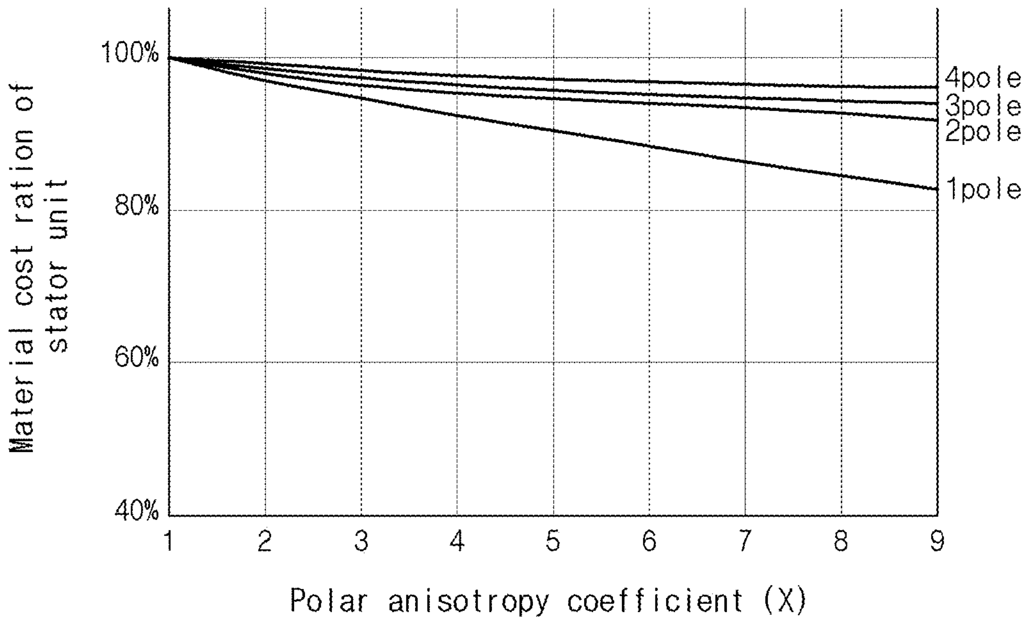
FIG. 15 is a graph illustrating a rate of change of material cost of an example of a stator unit with respect to a polar anisotropy coefficient of an example of a magnet.
Figure 16:
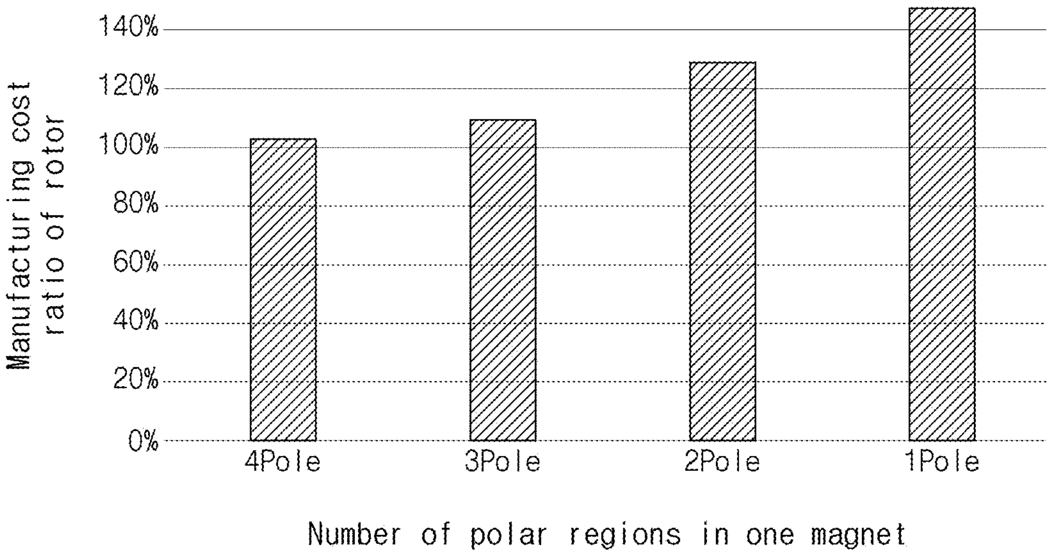
FIG. 16 is a graph illustrating a manufacturing cost ratio of an example of a rotor with respect to the number of polar regions in an example of one magnet.
Figure 17:
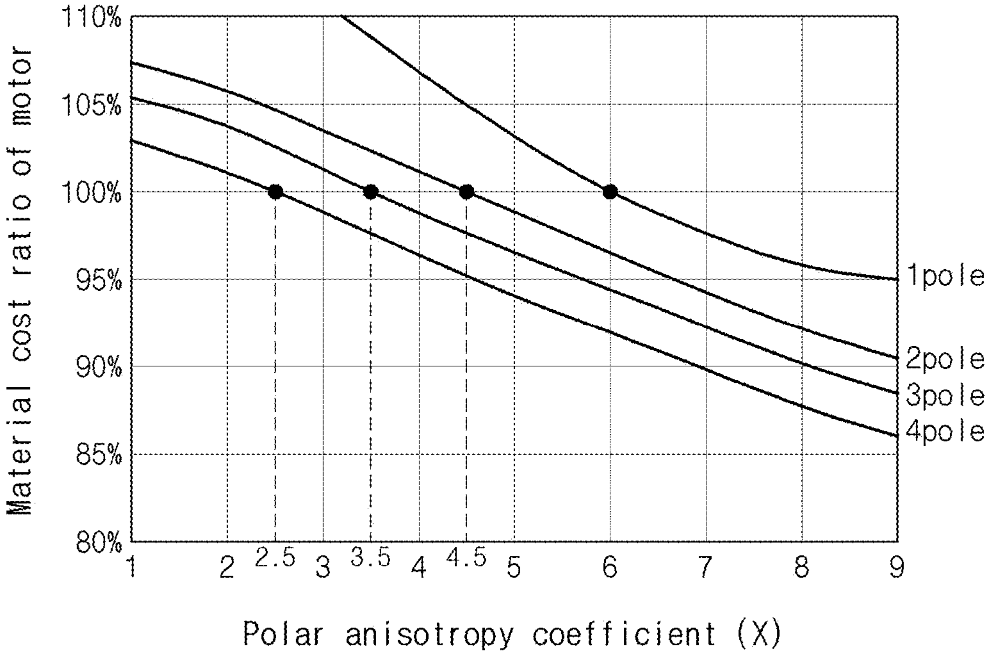
FIG. 17 is a graph illustrating a rate of change of material cost of an example of a motor with respect to a polar anisotropy coefficient of an example of a magnet.
Figure 18:
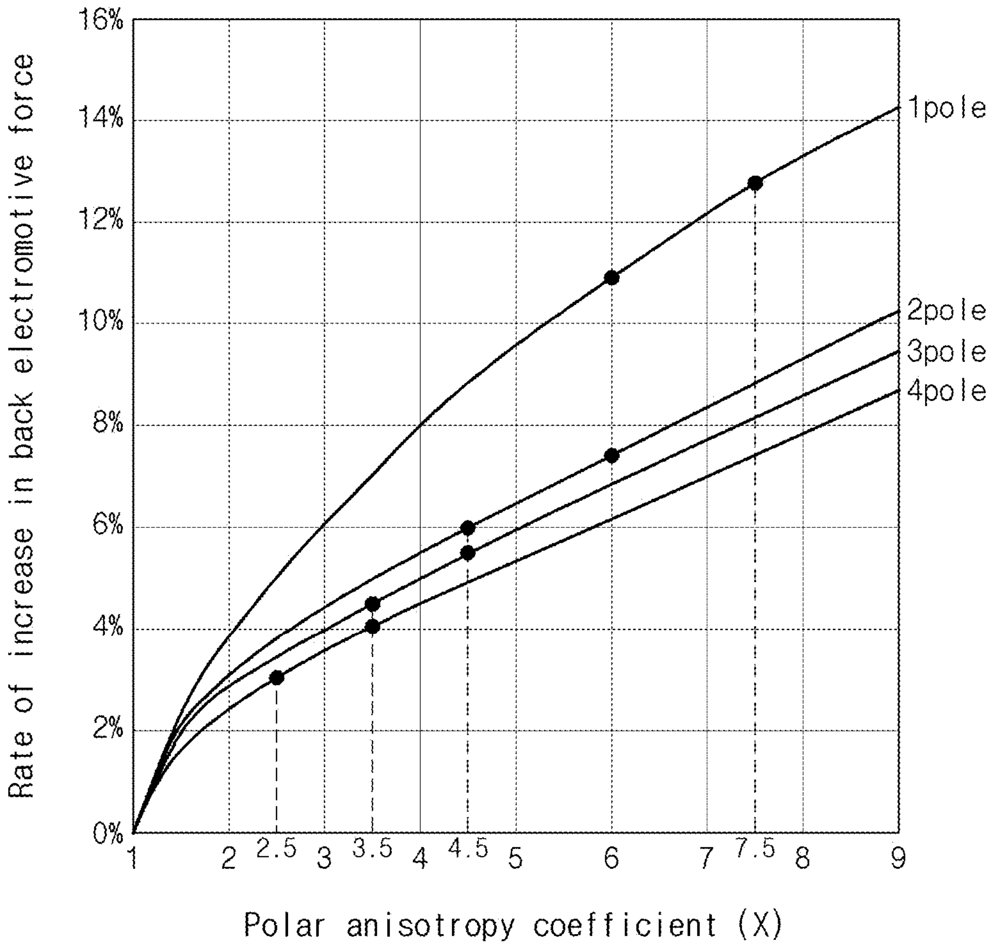
FIG. 18 is a graph illustrating a rate of increase in back electromotive force of an example of a motor with respect to a polar anisotropy coefficient of an example of a magnet.

FIG. 15 is a graph illustrating a rate of change of material cost of an example of a stator unit with respect to a polar anisotropy coefficient of an example of a magnet. FIG. 16 is a graph illustrating a manufacturing cost ratio of an example of a rotor with respect to the number of polar regions in an example of one magnet. FIG. 17 is a graph illustrating a rate of change of material cost of an example of a motor with respect to a polar anisotropy coefficient of an example of a magnet. FIG. 18 is a graph illustrating a rate of increase in back electromotive force of an example of a motor with respect to a polar anisotropy coefficient of an example of a magnet.

As illustrated FIG. 14, when the polar anisotropy coefficient (X) increases, the back electromotive force of the motors 150 and 160 can increase. In general, as a stacking height of the stator core in the same motor 160 decreases, the back electromotive force of the motor can decrease.

When increasing the polar anisotropy coefficient (X) to 1 or more, the polar anisotropy coefficient (X) can be set to a certain level based on the back electromotive force and the stacking height of the stator core. For example, when the polar anisotropy coefficient (X) is set to 1 or higher and the stacking height of the stator core is reduced, similar effect on the back electromotive force can be achieved as if the polar anisotropy coefficient (X) was 1. In other words, when the polar anisotropy coefficient (X) is set to 1 or more, it can have an effect of reducing the material cost of the stator unit by reducing the stacking height of the stator core.

Referring to FIG. 15, the graph illustrates that the material cost of the stator unit of the motors 150 and 160 decreases when the polar anisotropy coefficient (X) of the motors 150 and 160 increases. For example, when the polar anisotropy coefficient (X) increases, the back electromotive force of the motors 150 and 160 increases, and as illustrated in FIG. 15, the material cost of the stator unit can be reduced based on stacking of the stator units of the motors 150 and 160 being reduced. Here, the material cost ratio of the stator unit refers to a stator unit material cost (based on changed polar anisotropy coefficient (X)) compared to the stator unit material cost (based on the polar anisotropy coefficient (X) being set to 1).

Referring to FIG. 16, the graph illustrates the manufacturing cost ratio of the rotor 160 relative to the number of polar regions (1622, 1623, 1624, 1625, 1626, 1627, 1628, 1629, 1630, 1631, 1632) in a magnet. Here, the manufacturing cost ratio of the rotor 160 refers to the manufacturing cost of the rotor when the number of polar regions in one magnet 162 is less than 6 compared to the manufacturing cost of the rotor 160 when one magnet 162 consists of 6 polar regions.

Even if the number of polar regions (1622, 1623, 1624, 1625, 1626, 1627, 1628, 1629, 1630, 1631, 1632) of one magnet 162 can change in the rotor 160 of the same size, the overall mass of the magnets 162 in the rotor 160 does not change significantly.

However, as the number of polar regions (1622, 1623, 1624, 1625, 1626, 1627, 1628, 1629, 1630, 1631, 1632) in one magnet 162 increases, the number of magnets 162 in the rotor 160 decreases. As described above, for example, when the number of the polar regions 1622 and 1623 in one magnet 162 is 1, the number of physical magnets 162 of the rotor 160 can be 48. For example, when the number of the polar regions 1624 and 1625 in one magnet 162 is 2, the number of physical magnets 162 of the rotor 160 can be 24. For example, when the number of the polar regions 1626, 1627, and 1628 in one magnet 162 is 3, the number of physical magnets 162 of the rotor 160 can be 16. For example, when the number of the polar regions 1629, 1630, 1631, and 1632 in one magnet 162 is 4, the number of physical magnets 162 of the rotor 160 can be 12. For example, when the number of the polar regions in one magnet 162 is 6, the number of physical magnets 162 of the rotor 160 can be 8.

As the number of physical magnets 162 of the rotor 160 increases, the number of operations required to attach the magnets 162 to the inside of the rotor core 164 can increase, and thus the operation cost can increase. In other words, as the number of polar regions (1622, 1623, 1624, 1625, 1626, 1627, 1628, 1629, 1630, 1631, 1632) in one magnet 162 decreases, the manufacturing cost of the rotor 160 can increase.

Referring to FIG. 17, the graph illustrates the material cost ratio of the motors 150 and 160 relative to the polar anisotropy coefficient (X) of the magnet 162. For example, the material cost of the motors 150 and 160 can include the material cost of the stator unit described in FIG. 15 and the manufacturing cost of the rotor 160 described in FIG. 16.

Based on 100% material cost ratio of the motors 150 and 160 in FIG. 17, it can be seen that when the number of the polar regions 1622 and 1623 in one magnet 162 is 1, the polar anisotropy coefficient (X) can be 6, when the number of the polar regions 1624 and 1625 is 2, the polar anisotropy coefficient (X) can be 4.5, when the number of the polar regions 1626, 1627, and 1628 can be 3, the polar anisotropy coefficient (X) can be 3.5, and when the number of the polar regions 1629, 1630, 1631, and 1632 is 4, the polar anisotropy coefficient (X) can be 2.5.

Moreover, based on the material cost ratio of the motors 150 and 160 being reduced by less than 100%, the following is observed. For example, when the number of the at least one polar region 1622 and 1623 is 1, the polar anisotropy coefficient (X) exceeds 6, when the number of the at least one polar region 1624 and 1625 is 2, the polar anisotropy coefficient (X) can exceed 4.5. For example, when the number of the at least one polar region 1626, 1627, and 1628 is 3, the polar anisotropy coefficient (X) can exceed 3.5. For example, when the number of the at least one polar region 1629, 1630, 1631, and 1632 is 4, the polar anisotropy coefficient (X) can exceed 2.5. Such trend indicates the lowest threshold for setting the polar anisotropy coefficient (X) within the limited material cost of the motors 150 and 160.

Therefore, referring to FIG. 18, considering the limited material cost of the motors 150 and 160 without occurrence of cracks in the magnet 162, following design or orientation of the magnet 162 with optimal polar anisotropy coefficient (X) can be implemented. For example, when the number of the at least one polar region 1622 and 1623 is 1, the polar anisotropy coefficient (X) can be between 6 and 7.5. For example, when the number of the at least one polar region 1624 and 1625 is 2, the polar anisotropy coefficient (X) can be between 4.5 and 6. For example, when the number of the at least one polar region 1626, 1627, and 1628 is 3, the polar anisotropy coefficient (X) can be between 3.5 and 4.5. For example, when the number of the at least one polar region 1629, 1630, 1631, and 1632 is 4, the polar anisotropy coefficient (X) can be between 2.5 and 3.5.

Figure 19:
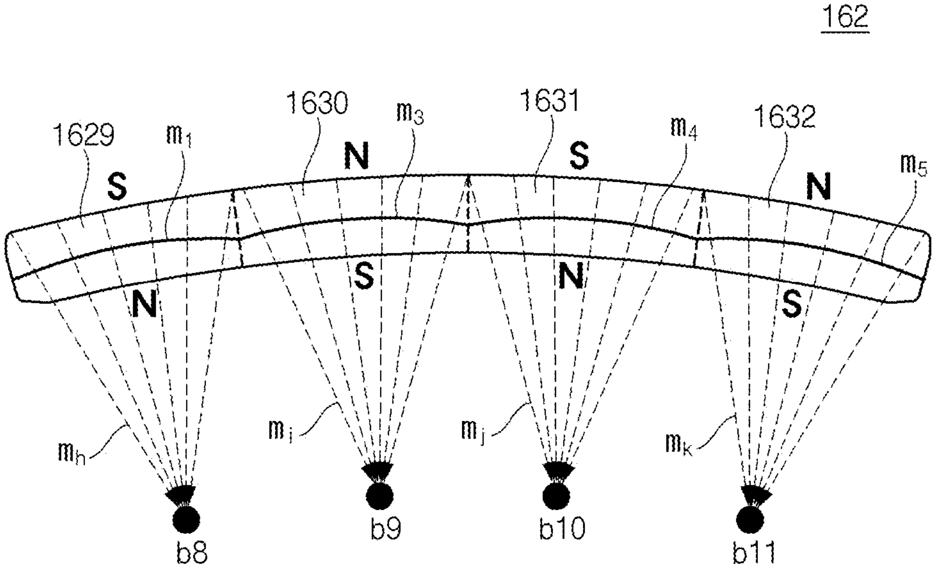
FIGS. 19 and 20 are diagrams illustrating a plurality of magnetic center lines of an example of a magnet.
Figure 20:
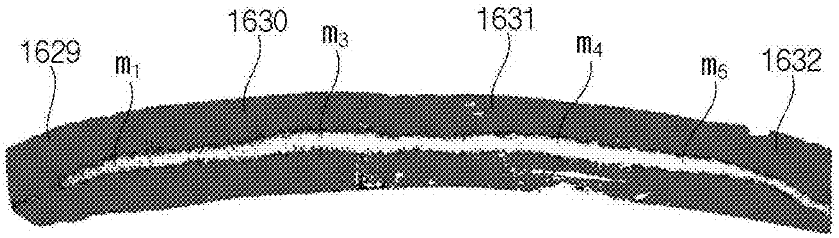

FIGS. 19 and 20 are diagrams illustrating a plurality of magnetic center lines of an example of a magnet.

Referring to FIG. 19, a plurality of polar regions 1629, 1630, 1631, and 1632 of the magnet 162 can have a plurality of magnetic center lines ($m_1$, $m_3$, $m_4$, and $m_5$). The shapes of the plurality of magnetic center lines ($m_1$, $m_3$, $m_4$, and $m_5$) can be symmetrical to each other. For example, a radius of curvature of each of the plurality of magnetic center lines ($m_1$, $m_3$, $m_4$, and $m_5$) can be the same, and a circumferential length of each of the plurality of magnetic center lines ($m_1$, $m_3$, $m_4$, and $m_5$) can be the same. Based on such symmetry of the shapes, uniformity of the radius of curvature, and/or uniformity of the circumferential length, an output of the motors 150 and 160 can be increased and vibration generation and noise can be reduced and/or prevented.

In contrast, referring to FIG. 20, the shapes of the plurality of magnetic center lines ($m_1$, $m_3$, $m_4$, and $m_5$) of the plurality of polar regions (1629, 1630, 1631, and 1632) of the magnet 162 can be formed asymmetrically, as a result of its manufacturing process or when the magnet 162 is manufactured. Specifically, the shapes of the plurality of magnetic center lines ($m_1$, $m_3$, $m_4$, and $m_5$) can be formed asymmetrically due to the magnetic division region between the polar regions (1629, 1630, 1631, and 1632) and the physical division region at both ends of the magnet 162.

For example, a radius of curvature of a first magnetic center line $m_1$ of an eighth polar region 1629 can be different from a radius of curvature of a second magnetic center line $m_3$ of a ninth pole region 1630, and a radius of curvature of a third magnetic center line m4 of a tenth polar region 1631 can be different. Specifically, the radius of curvature on one side (left) of the first magnetic center line m1 of the eighth pole region 1629 can be different from the radius of curvature on the other side (right). Additionally, a circumferential length of the first magnetic center line $m_1$ of the eighth polar region 1629 can be different from a circumferential length of the second magnetic center line $m_3$ of the ninth polar region 1630 and a circumferential length of the third magnetic center line $m_4$ of the tenth polar region 1631.

For example, a radius of curvature of a fourth magnetic center line ($m_5$) of an 11th polar region 1632 can be different from the radius of curvature of the second magnetic center line $m_3$ of the ninth polar region 1630, and the radius of curvature of the third magnetic center line $m_4$ of the tenth pole region 1631. Specifically, the radius of curvature on one side (left side) of the eleventh polar region 1632 can be different from the radius of curvature on the other side (right side). Additionally, a circumferential length of the fourth magnetic center line $m_5$ of the eleventh polar region 1632 can be different from the circumferential length of the second magnetic center line $m_3$ of the ninth polar region 1630 and the circumferential length of the third magnetic center line $m_4$ of the tenth polar region 1631.

As describe above, in such cases where the shapes of the magnetic center lines are asymmetrical, the radius of curvatures of the magnetic center lines may not be uniform, and the circumferential lengths of the magnetic center lines may not be uniform, the output of the motors 150 and 160 can be reduced, and the vibration and noise may not be reduced.

Figure 21:
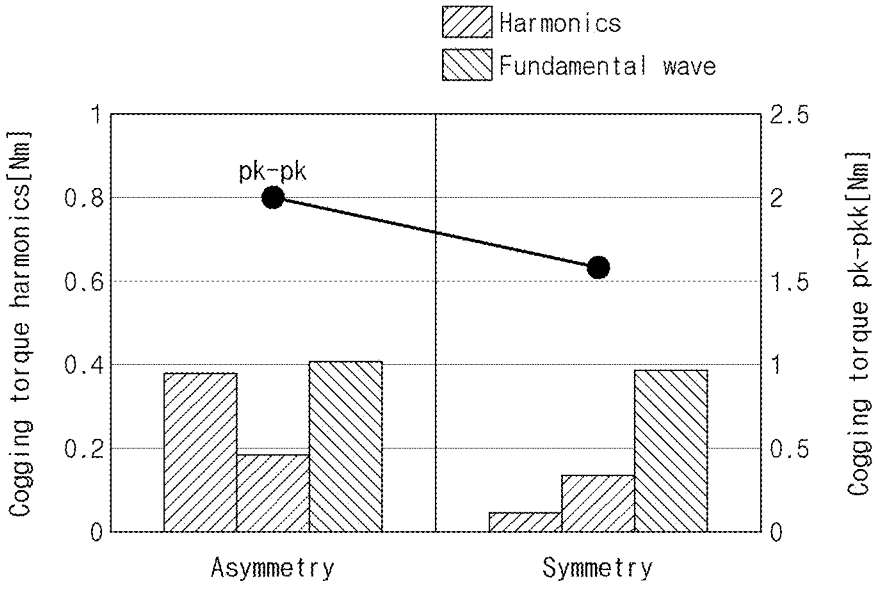
FIG. 21 is a graph illustrating a cogging torque of an example of a motor based on relationship among a plurality of magnetic center lines of an example of a magnet.

FIG. 21 is a graph illustrating a cogging torque of an example of a motor based on relationship among a plurality of magnetic center lines of an example of a magnet.

Referring to FIG. 21, the graph illustrates that when the shapes of the plurality of magnetic center lines ($m_1$, $m_3$, $m_4$, and $m_5$) of the plurality of polar regions (1629, 1630, 1631, and 1632) of the magnet 162 are symmetric, the cogging torque harmonics of the motors 150 and 160 and the cogging torque pk-pk of the motors 150 and 160 can be reduced compared to the case where the shapes of the plurality of magnetic center lines ($m_1$, $m_3$, $m_4$, and $m_5$) of the plurality of polar regions (1629, 1630, 1631, and 1632) of the magnet 162 are asymmetric. That is, when the shapes of the plurality of magnetic center lines ($m_1$, $m_3$, $m_4$, and $m_5$) of the plurality of polar regions (1629, 1630, 1631, and 1632) of the magnet 162 are symmetric, the output of the motors 150 and 160 can increase and the vibration and noise generation can be reduced due to a reduction of the cogging torque. Here, the cogging torque refers to a force that can block the rotor 160 from rotating when the rotor 160 is about to rotate, and it can be generated by a force acting between the magnet 162 of the rotor 160 and the stator unit of the stator 150.

The above examples in FIGS. 19 to 21 are described with respect to the four polar regions, and the same description can be applied to two, three, or more than four polar regions.

Figure 22:
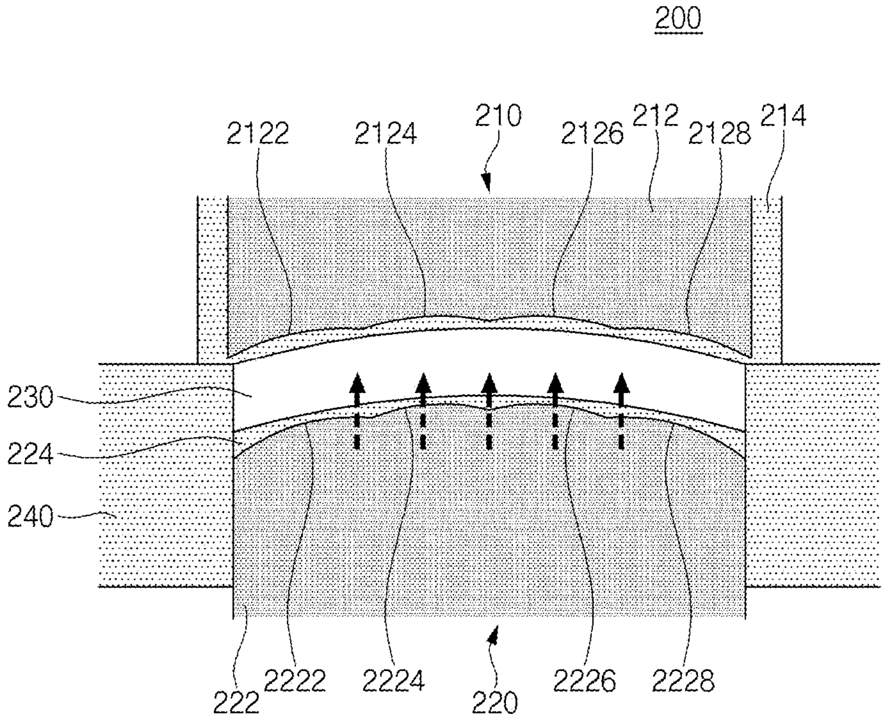
FIG. 22 is a diagram illustrating a cross-sectional view of an example of a magnet orientation device and an example of a magnet raw material.

FIG. 22 is a diagram illustrating a cross-sectional view of an example of a magnet orientation device and a magnet raw material.

Referring to FIG. 22, the magnet orientation device 200 can include an upper plate 210, a lower plate 220, and a die 240, but additional configurations are not excluded. The magnet orientation device 200 can produce a magnet 162 through a magnetization process in which an electron array of the magnet raw material 230 disposed inside can be oriented in a certain direction and can be magnetically polarized by applying an external magnetic field.

The upper plate 210 can be disposed on the magnet raw material 230. For example, the magnet raw material 230 can be formed into an arc shape that is convex upward. Moreover, a lower surface of the upper plate 210 can be formed to be concave upward corresponding to an upper surface of the magnet raw material 230.

The upper plate 210 can include a first magnetic region 212 and a first non-magnetic region 214 that surround the first magnetic region 212.

A lower surface of the first magnetic region 212 can be formed to be concave upward overall. The lower surface of the first magnetic region 212 can protrude downward from a center of the lower surface to side ends or side edges of the lower surface. The lower surface of the first magnetic region 212 can define a plurality of grooves 2122, 2124, 2126, and 2128 that are concave upward. Each of the plurality of grooves 2122, 2124, 2126, and 2128 can be a curvature.

A lower surface of the first non-magnetic region 214 can be formed in a shape corresponding to the upper surface of the magnet raw material 230. The lower surface of the first non-magnetic region 214 can be formed to be concave upward. The lower surface of the first non-magnetic region 214 can protrude downward from the center of the lower surface to side ends or side edges of the lower surface.

The lower plate 220 can be disposed below the magnet raw material 230. An upper surface of the lower plate 220 can be formed to be convex upward corresponding to a lower surface of the magnet raw material 230.

The lower plate 220 can include a second magnetic region 222 and a second non-magnetic region 224 that surround the second magnetic region 222.

An upper surface of the second magnetic region 222 can be formed to be convex upward overall. The upper surface of the second magnetic region 222 can protrude upward from both sides to the center. The upper surface of the second magnetic region 222 can include a plurality of protrusions 2222, 2224, 2226, and 2228 that are convex upward. Each of the plurality of protrusions 2222, 2224, 2226, and 2228 can be a curvature.

An upper surface of the second non-magnetic region 224 can be formed in a shape corresponding to the lower surface of the magnet raw material 230. The upper surface of the second non-magnetic region 224 can be formed to be convex upward. The upper surface of the second non-magnetic region 224 can protrude upward from both side ends or side edges of the upper surface to the center of the upper surface.

The die 240 can be disposed on both sides of the magnet raw material 230 to support the magnet raw material 230. The lower surface of the upper plate 210 can be disposed on an upper surface of the die 240, and an outer surface of the lower plate 220 can be disposed on an inner surface of the die 240. Alternatively, the upper surface of the lower plate 220 can be disposed on a lower surface of the die 240, and an outer surface of the upper plate 210 can be disposed on the inner surface of the die 240.

Figure 23:
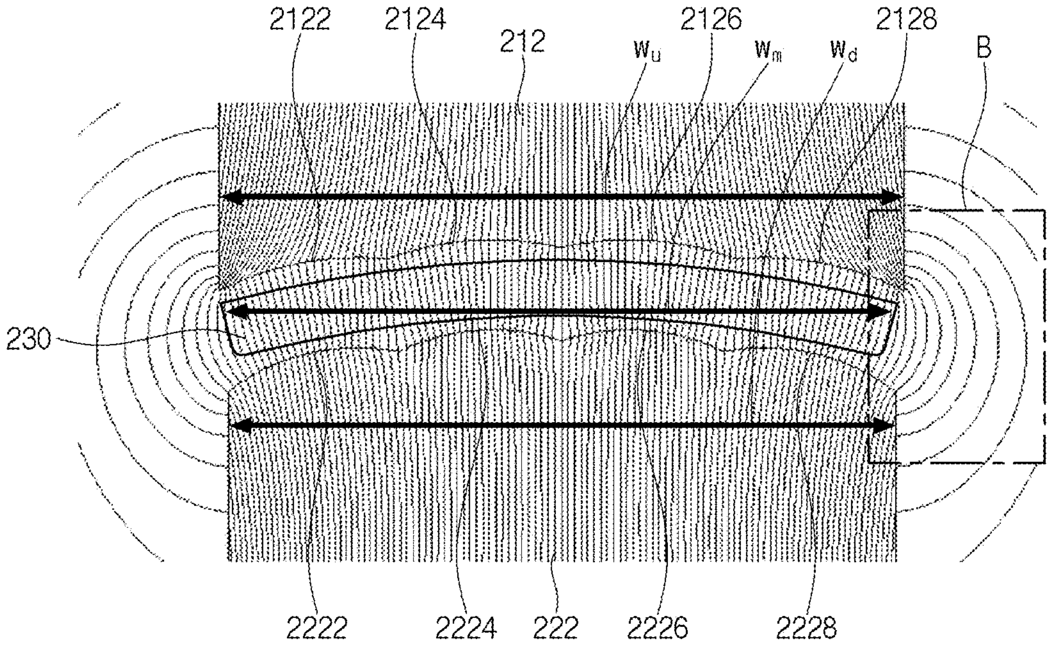
FIG. 23 is a diagram illustrating magnetic field analysis of a magnetic region and a magnet raw material of an example of a magnet orientation device.

FIG. 23 is a diagram illustrating magnetic field analysis of a magnetic region and a magnet raw material of an example of a magnet orientation device.

Referring to FIG. 23, the diagram illustrates that a magnetic field can be formed between the magnetic regions 212 and 222 and the magnet raw material 230 of the magnet orientation device 200. In this case, the magnetic flux is bent in a region B on both sides of the magnet raw material 230 due to fringe effect. This fringe effect can be influenced by a horizontal length ($W_u$) of the first magnetic region 212, a horizontal length ($W_d$) of the second magnetic region 222, and/or a horizontal length ($W_m$) of the magnet raw material 230. Using this, the magnetic center lines ($m_1$, $m_3$, $m_4$, $m_5$) of the plurality of polar regions (1629, 1630, 1631, 1632) of the magnet 162 can be formed symmetrically.

The horizontal length $W_u$ of the first magnetic region 212 can be the longest length of the first magnetic region 212 in the horizontal direction, the horizontal length $W_m$ of the magnet raw material 230 can be the longest length of the magnet raw material 230 in the horizontal direction, and the horizontal length ($W_d$) of the second magnetic region 222 can be the longest length of the second magnetic region 222 in the horizontal direction.

Figure 24:
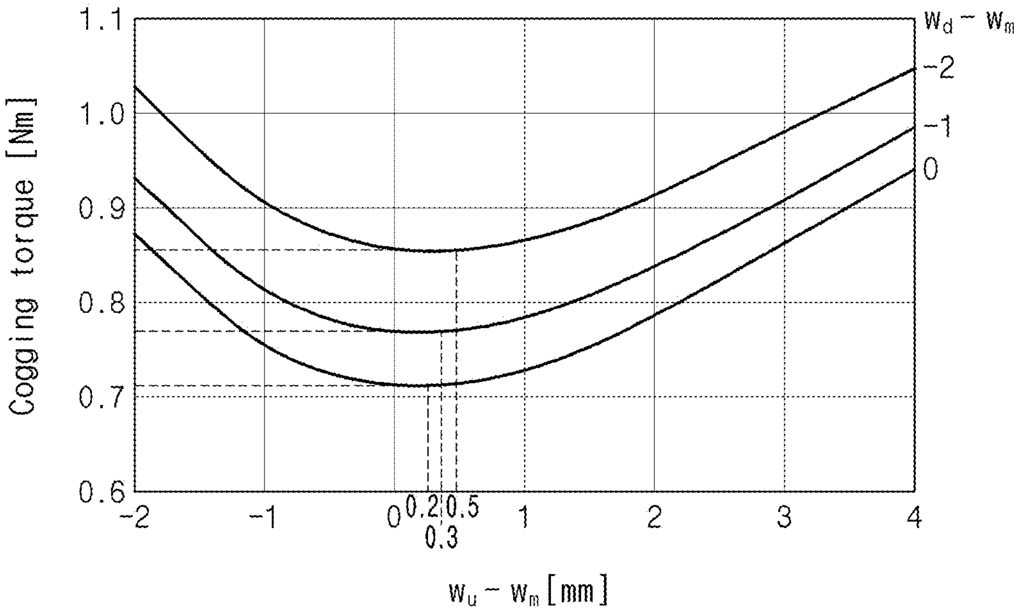
FIG. 24 is a graph illustrating a cogging torque of an example of a motor relative to a relationship among horizontal lengths of an upper plate, a lower plate, and a magnet raw material of an example of a magnet orientation device.

FIG. 24 is a graph illustrating a cogging torque of an example of a motor relative to a relationship among horizontal lengths of an upper plate, a lower plate, and a magnet raw material of an example of a magnet orientation device.

Referring to FIG. 24, the graph illustrates that the cogging torque of the motors 150 and 160 can be reduced as the difference between the horizontal length ($W_m$) of the magnet raw material 230 and the horizontal length ($W_d$) of the second magnetic region 222 approaches 0. In addition, although not shown, when the horizontal length ($W_d$) of the second magnetic region 222 is greater than the horizontal length ($W_m$) of the magnet raw material 230, the cogging torque can increase. That is, when a difference between the horizontal length ($W_m$) of the magnet raw material 230 and the horizontal length ($W_d$) of the second magnetic region 222 is equal to or greater than 0 and equal to or less than 2 mm (e.g., 0-2 mm), the cogging torque of the motors 150 and 160 can be reduced. In some implementations, the cogging torque can be reduced when the horizontal length ($W_m$) of the magnet raw material 230 and the horizontal length ($W_d$) of the second magnetic region 222 are the same.

That is, the horizontal length ($W_d$) of the second magnetic region 222 can be equal to or less than the horizontal length ($W_m$) of the magnet raw material 230. The difference between the horizontal length ($W_m$) of the magnet raw material 230 and the horizontal length (Wd) of the second magnetic region 222 can be equal to or greater than 0 and equal to and less than 2 mm (e.g., 0-2 mm). In some implementations, the horizontal length ($W_d$) of the second magnetic region 222 can be equal to the horizontal length ($W_m$) of the magnet raw material 230.

Also, referring to FIG. 24, when the horizontal length ($W_u$) of the first magnetic region 212 is greater than the horizontal length ($W_m$) of the magnet raw material 230, the cogging torque of the motors 150 and 160 can be reduced. for example, when the difference between the horizontal length ($W_u$) of the first magnetic region 212 and the horizontal length ($W_m$) of the magnet raw material 230 is equal to or greater than 0 and equal to or less than 1 mm (e.g., 0-1 mm), the cogging torque of the motors 150 and 160 can be reduced. In some implementations, when the difference between the horizontal length ($W_u$) of the first magnetic region 212 and the horizontal length ($W_m$) of the magnet raw material 230 is equal to or greater than 0.2 mm and equal to or less than 0.5 mm (e.g., 0.2-0.5 mm), the cogging torque of the motors 150 and 160 can be minimized.

For example, the horizontal length ($W_u$) of the first magnetic region 212 can be greater than the horizontal length ($W_m$) of the magnet raw material 230. The difference between the horizontal length ($W_u$) of the first magnetic region 212 and the horizontal length ($W_m$) of the magnet raw material 230 can be equal to or greater than 0.2 mm and equal to or less than 0.5 mm (e.g., 0.2-0.5 mm).

Based on such correlation between cogging torque and the horizontal lengths ($W_m$, $W_u$, $W_d$), the magnetic center lines ($m_1$, $m_3$, $m_4$, and $m_5$) of the plurality of polar regions (1629, 1630, 1631, and 1632) of the magnet 162 can be formed symmetrically, so that the output of the motors 150 and 160 can be increased, and vibration and noise generation can be reduced.

Figure 25:
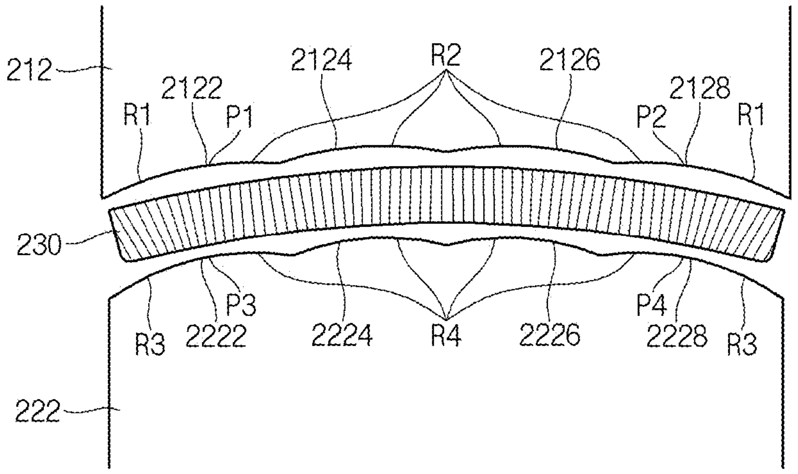
FIG. 25 is a diagram illustrating a cross-sectional view of a magnetic region and a magnet raw material of an example of a magnet orientation device.

FIG. 25 is a diagram illustrating a cross-sectional view of a magnetic region and a magnet raw material of an example of a magnet orientation device.

Referring to FIG. 25, the plurality of grooves 2122, 2124, 2126, and 2128 of the upper plate 210 can include a first groove 2122, a second groove 2124, and a third groove 2126, and a fourth groove 2128.

The shape of the first groove 2122 can be different from the shape of the second groove 2124 and the third groove 2126. The shape of the fourth groove 2128 can be different from the shape of the second groove 2124 and the third groove 2126. That is, the shape of the groove (e.g., the first groove 2122, the fourth groove 2128) adjacent to both sides (e.g., side ends, side edges) of the first magnetic region 212 can be formed differently from the shape of other grooves. Based on this difference in shapes of the grooves (e.g., grooves adjacent to both sides of the first magnetic region 212), the shapes of the magnetic center lines ($m_1$, $m_3$, $m_4$, and $m_5$) of the plurality of polar regions (1629, 1630, 1631, and 1632) of the magnet 162 can be formed to be symmetrical to each other.

Specifically, one side (left) region of based on P1 the first groove 2122 can have a first radius of curvature R1, and the other (right) region based on P1 of the first groove 2122 can have a second radius of curvature R2. The second groove 2124 and the third groove 2126 can have the second radius of curvature R2. One side (left) region based on P2 of the fourth groove 2128 can have the second radius of curvature R2, and the other (right) region based on P2 of the fourth groove 2128 can have the first radius of curvature R1.

Here, the first groove 2122 and the fourth groove 2128 can be referred to as grooves adjacent to both sides of the first magnetic region 212, and the second groove 2124 and the third groove 2126 can be referred to grooves other than the grooves adjacent to both sides of the first magnetic region 212).

In addition, the first groove 2122 and the fourth groove 2128 each can correspond to a side region (e.g., left side region, right side region) adjacent to both sides of the first magnetic region 212 among the grooves adjacent to each side of the first magnetic region 212. The second groove 2124 and the third groove 2126 can be referred to as other regions (e.g., regions other than the side regions).

The above examples are described with respect to the four grooves for four polar regions. In some implementations, the number of grooves can vary depending on the number of polar regions of the magnet 162.

The plurality of protrusions 2222, 2224, 2226, and 2228 of the lower plate 220 can include a first protrusion 2222, a second protrusion 2224, a third protrusion 2226, and a fourth protrusion 2228.

The shape of the first protrusion 2222 can be different from the shape of the second protrusion 2224 and the third protrusion 2226. Further, the shape of the fourth protrusion 2228 can be different from the shape of the second protrusion 2224 and the third protrusion 2226. For example, the shape of the protrusions adjacent to both sides of the second magnetic region 222 can be formed differently from the shapes of other protrusions. Based on such different shapes of the protrusions (e.g., protrusions adjacent to both sides of the second magnetic region 222), the shapes of the magnetic center lines (m1, m3, m4, and m5) of the plurality of polar regions (1629, 1630, 1631, and 1632) of the magnet 162 can be formed to be symmetrical to each other.

Specifically, one side (left) region based on P3 of the first protrusion 2222 has a third radius of curvature R3, and the other side (right) region based on P3 of the first protrusion 2222 has a fourth radius of curvature R4. The second protrusion 2224 and the third protrusion 2226 can have the fourth radius of curvature R4. One side (left) region based on P4 of the fourth protrusion 2228 can have the fourth radius of curvature R4, and the other side (right) region based on P4 of the fourth protrusion 2228 can have the third radius of curvature R3.

Here, the first protrusion 2222 and the fourth protrusion 2228 can be referred to as protrusions adjacent to both sides of the second magnetic region 222, and the second protrusion 2224 and the third protrusion 2226 can be referred to as other protrusions (e.g., protrusions other than the protrusions adjacent to both sides of the second magnetic region 222).

In addition, the first protrusion 2222 and the fourth protrusion 2228 each can correspond to a side region (e.g., left side region, right side region) adjacent to each side of the second magnetic region 222. The second protrusion 2224 and the third protrusion 2226 can be referred to as other regions (e.g., regions other than the side regions).

The above examples are described with respect to the four protrusions for four polar regions. In some implementations, the number of grooves can vary depending on the number of polar regions of the magnet 162.

Figure 26:
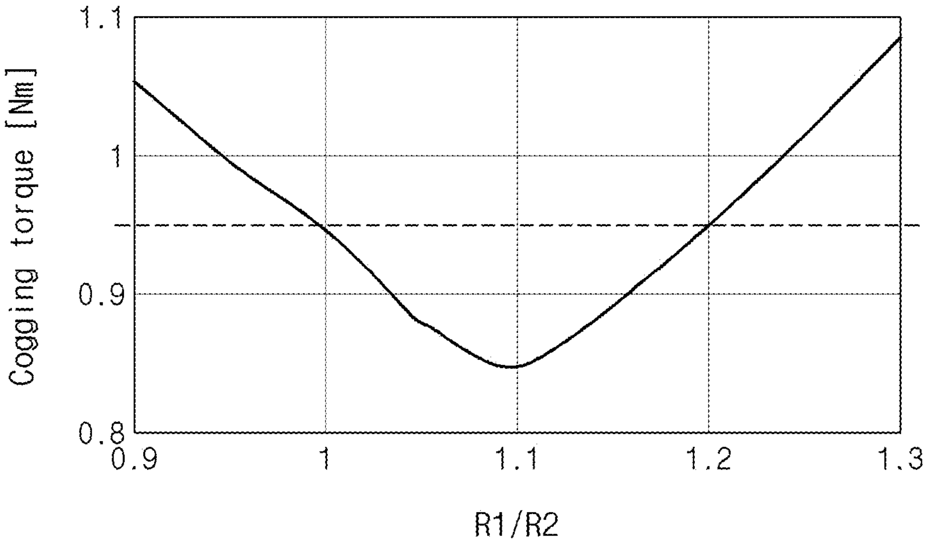
FIG. 26 is a graph illustrating a cogging torque of an example of a motor relative to a relationship between radii of curvatures of a plurality of grooves of an upper plate of an example of a magnet orientation device.

FIG. 26 is a graph illustrating a cogging torque of an example of a motor relative to a relationship between radii of curvatures of a plurality of grooves of an upper plate of an example of a magnet orientation device.

Referring to FIG. 26, the graph illustrates that when the radius of the first curvature (R1) is greater than the second curvature (R2), the cogging torque of the motors 150 and 160 can be reduced compared to the case where the radius of the first curvature (R1) and the radius of the second curvature (R2) are the same. Specifically, when a value obtained by dividing the radius of the first curvature (R1) by the radius of the second curvature (R2) is between 1 and 1.2, the cogging torque of the motors 150 and 160 can be reduced.

That is, the radius of the first curvature (R1) can be greater than the radius of the second curvature (R2). In some implementations, the value obtained by dividing the radius of the first curvature (R1) by the radius of the second curvature (R2) can be between 1 and 1.2. Based on such correlation between the cogging torque and R1/R2, the magnetic center lines ($m_1$, $m_3$, $m_4$, and $m_5$) of the magnet 162 having a plurality of polar regions (1629, 1630, 1631, and 1632) can be oriented symmetrically so that the output of the motors 150 and 160 can be improved and the noise can be reduced.

Figure 27:
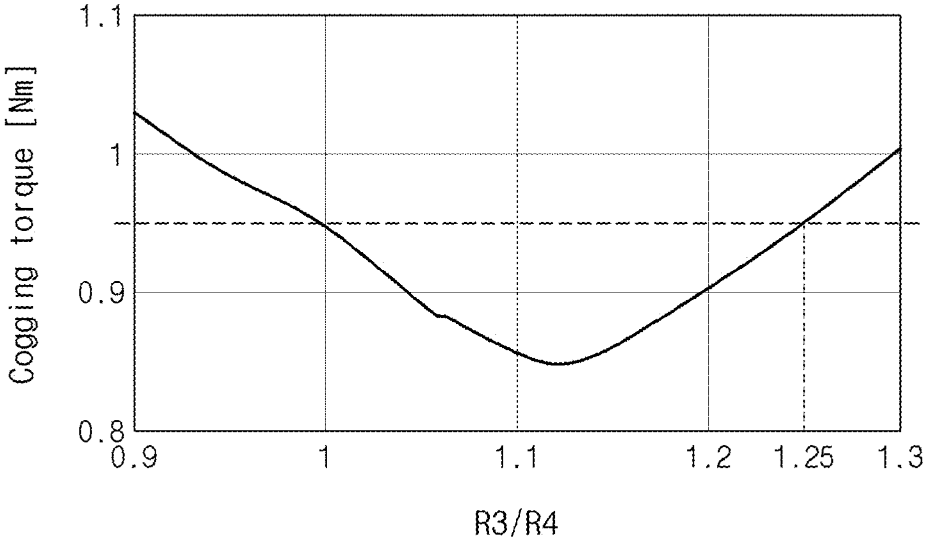
FIG. 27 is a graph illustrating a cogging torque of an example of a motor based on a relationship between radii of curvatures of a plurality of protrusions of a lower plate of an example of a magnet orientation device.

FIG. 27 is a graph illustrating a cogging torque of an example of a motor based on a relationship between radii of curvatures of a plurality of protrusions of a lower plate of an example of a magnet orientation device.

Referring to FIG. 27, the graph illustrates that when the size of the third curvature (R3) is greater than the fourth curvature (R4), the cogging torque of the motors 150 and 160 can be reduced compared to the case where the size of the existing third curvature (R3) and the size of the fourth curvature (R4) are the same. Specifically, when a value obtained by dividing the third curvature (R3) by the fourth curvature (R4) is between 1 and 1.25, the cogging torque of the motors 150 and 160 can be reduced.

For example, the size of the third curvature (R3) can be greater than the size of the fourth curvature (R4). In some implementations, the value obtained by dividing the third curvature (R3) by the fourth curvature (R4) can be between 1 and 1.25. Based on such correlation between the cogging torque and R3/R4, the magnetic center lines ($m_1$, $m_3$, $m_4$, and $m_5$) of the magnet 162 having a plurality of polar regions (1629, 1630, 1631, and 1632) can be oriented symmetrically, so that the output of the motors 150 and 160 can be improved and the noise can be reduced.

What is claimed is:

1. A magnet orientation device comprising:
- an upper plate disposed on a magnet raw material and having a convex upward arc shape;
- a lower plate disposed below the magnet raw material; and
- a plurality of dies disposed at a first side and a second side of the magnet raw material,
- wherein the upper plate comprises a first magnetic region and a first non-magnetic region that surround the first magnetic region,
- wherein the lower plate comprises a second magnetic region and a second non-magnetic region that surround the second magnetic region,
- wherein a lower surface of the first magnetic region provides a plurality of concave upward grooves,
- wherein an upper surface of the second magnetic region provides a plurality of convex upward protrusions,
- wherein a horizontal length of the first magnetic region is greater than a horizontal length of the magnet raw material, and
- wherein a horizontal length of the second magnetic region is equal to or less than the horizontal length of the magnet raw material.

2. The magnet orientation device of claim 1, wherein a difference between the horizontal length of the magnet raw material and the horizontal length of the second magnetic region is greater than or equal to 0 and less than or equal to 2 millimeters (mm).

3. The magnet orientation device of claim 2, wherein the horizontal length of the magnet raw material is equal to the horizontal length of the second magnetic region.

4. The magnet orientation device of claim 1, wherein a difference between the horizontal length of the first magnetic region and the horizontal length of the magnet raw material is greater than or equal to 0.2 and less than or equal to 0.5 millimeter (mm).

5. The magnet orientation device of claim 1, wherein the first non-magnetic region protrudes downward from a center of the first non-magnetic region to a first side end and a second side end of the first non-magnetic region, and wherein the second non-magnetic region protrudes upward from a first side end and a second side end of the second non-magnetic region to a center of the second non-magnetic region.

6. The magnet orientation device of claim 1, wherein each of the plurality of concave upward grooves and the plurality of convex upward protrusions is a curvature.

7. A magnet orientation device comprising:

an upper plate disposed on a magnet raw material and having a convex upward arc shape;

a lower plate disposed below the magnet raw material; and a plurality of dies disposed at a first side and a second side of the magnet raw material, wherein the upper plate comprises a first magnetic region and a first non-magnetic region that surround the first magnetic region, wherein the lower plate comprises a second magnetic region and a second non-magnetic region that surround the second magnetic region, wherein a lower surface of the first magnetic region provides a plurality of concave upward grooves, wherein an upper surface of the second magnetic region provides a plurality of convex upward protrusions, wherein each of the plurality of concave upward grooves and the plurality of convex upward protrusions includes a curvature, wherein, among the plurality of concave upward grooves, a shape of concave upward grooves adjacent to a first side end and a second side end of the first magnetic region is different from a shape of the other concave upward grooves, and wherein, among the plurality of convex upward protrusions, a shape of convex upward protrusions adjacent to a first side end and a second side end of the second magnetic region is different from a shape of the other convex upward protrusions.

8. The magnet orientation device of claim 7, wherein, among the plurality of concave upward grooves, the concave upward grooves adjacent to the side ends of the first magnetic region each includes a plurality of curvatures and the other grooves each includes a single curvature.

9. The magnet orientation device of claim 8, wherein, among the plurality of concave upward grooves, the concave upward grooves adjacent to the side ends of the first magnetic region each includes a first curvature and the other concave upward grooves each includes a second curvature that is different from the first curvature.

10. The magnet orientation device of claim 9, wherein a radius of the first curvature is greater than a radius of the second curvature.

11. The magnet orientation device of claim 10, wherein a value obtained by dividing the first curvature by the second curvature is between 1 and 1.2.

12. The magnet orientation device of claim 7, wherein, among the plurality of convex upward protrusions, the convex upward protrusions adjacent to the side ends of the second magnetic region each includes a plurality of curvatures, and the other convex upward protrusions each includes a single curvature.

13. The magnet orientation device of claim 12, wherein, among the plurality of convex upward protrusions, the convex upward protrusions adjacent to the side ends of the second magnetic region each includes a third curvature, and the other convex upward protrusions each includes a fourth curvature that is different from the third curvature.

14. The magnet orientation device of claim 13, wherein a radius of the third curvature is greater than a radius of the fourth curvature.

15. The magnet orientation device of claim 14, wherein a value obtained by dividing the third curvature by the fourth curvature is between 1 and 1.25.

16. The magnet orientation device of claim 7, wherein the first non-magnetic region protrudes downward from a center of the first non-magnetic region to the side ends of the first non-magnetic region, and wherein the second non-magnetic region protrudes upward from the side ends of the second non-magnetic region to a center of the second non-magnetic region.

17. The magnet orientation device of claim 7, wherein a horizontal length of the first magnetic region is greater than a horizontal length of the magnet raw material.

18. The magnet orientation device of claim 7, wherein a horizontal length of the second magnetic region is equal to or less than a horizontal length of the magnet raw material.

19. A magnet comprising:

a magnet orientation device comprising:

an upper plate disposed on a magnet raw material and having a convex upward arc shape;

a lower plate disposed below the magnet raw material; and a plurality of dies disposed at a first side and a second side of the magnet raw material, wherein the upper plate comprises a first magnetic region and a first non-magnetic region that surround the first magnetic region, wherein the lower plate comprises a second magnetic region and a second non-magnetic region that surround the second magnetic region, wherein a lower surface of the first magnetic region provides a plurality of concave upward grooves, wherein an upper surface of the second magnetic region provides a plurality of convex upward protrusions, wherein a horizontal length of the first magnetic region is greater than a horizontal length of the magnet raw material, and wherein a horizontal length of the second magnetic region is equal to or less than the horizontal length of the magnet raw material.

20. The magnet of claim 19, wherein a difference between the horizontal length of the magnet raw material and the horizontal length of the second magnetic region is greater than or equal to 0 and less than or equal to 2 millimeters (mm).

* * * * *